United States Patent
Kato et al.

(10) Patent No.: US 9,305,555 B2
(45) Date of Patent: Apr. 5, 2016

(54) ONBOARD INFORMATION DEVICE

(75) Inventors: Shin Kato, Tokyo (JP); Takayoshi Chikuri, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 14/384,740

(22) PCT Filed: Jun. 25, 2012

(86) PCT No.: PCT/JP2012/004099
§ 371 (c)(1),
(2), (4) Date: Sep. 12, 2014

(87) PCT Pub. No.: WO2014/002128
PCT Pub. Date: Jan. 3, 2014

(65) Prior Publication Data
US 2015/0006167 A1  Jan. 1, 2015

(51) Int. Cl.
*G10L 15/00* (2013.01)
*G10L 17/22* (2013.01)
(Continued)

(52) U.S. Cl.
CPC .............. *G10L 17/22* (2013.01); *B60W 50/10* (2013.01); *G01C 21/3608* (2013.01); *G01C 21/3629* (2013.01); *G10L 15/00* (2013.01); *G10L 15/22* (2013.01); *G10L 2015/088* (2013.01); *G10L 2015/228* (2013.01)

(58) Field of Classification Search
CPC ......... G10L 15/00; G10L 15/02; G10L 15/08; G10L 15/20; G10L 15/22; G10L 15/24; G10L 15/26; G10L 2015/00; G10L 2015/02; G10L 2015/08; G10L 2015/008; G10L 2015/223; G10L 2015/225

USPC .................. 704/231, 235, 251, 249, 275, 270
See application file for complete search history.

(56) References Cited

U.S. PATENT DOCUMENTS

| 2005/0134117 A1* | 6/2005 | Ito ....................... B60R 16/0373 307/10.1 |
| 2008/0157940 A1* | 7/2008 | Breed ..................... B60C 11/24 340/425.5 |

(Continued)

FOREIGN PATENT DOCUMENTS

| JP | 2000-353294 A | 12/2000 |
| JP | 2001-5487 A | 1/2001 |

(Continued)

*Primary Examiner* — Qi Han
(74) *Attorney, Agent, or Firm* — Birch, Stewart, Kolasch & Birch, LLP

(57) ABSTRACT

Onboard information device mounted on vehicle to provide information for supporting passenger includes voice acquisition unit that continually detects and acquires voice the passenger utters while the onboard information device is operating; voice recognition unit that recognizes speech contents of the voice the voice acquisition unit acquires; vehicle state detector that detects vehicle state including environmental state in the vehicle, surrounding state of the vehicle or operating state of the vehicle; output controller that creates display data or voice data from the speech contents recognized by the voice recognition unit according to the vehicle state the vehicle state detector detects, and that controls output of the display data or voice data; and output unit that outputs the display data or voice data the output controller creates. It can perform effective conversation support in real time according to recognition result obtained by continually recognizing speech contents of the passenger.

17 Claims, 21 Drawing Sheets

(51) Int. Cl.
*G10L 15/22* (2006.01)
*G01C 21/36* (2006.01)
*B60W 50/10* (2012.01)
*G10L 15/08* (2006.01)

(56) References Cited

U.S. PATENT DOCUMENTS

2009/0055180 A1* 2/2009 Coon .................. B60R 16/0373
704/251
2010/0013760 A1 1/2010 Hirai et al.

2010/0182140 A1* 7/2010 Kohno .................. B60K 35/00
340/438

FOREIGN PATENT DOCUMENTS

| | | |
|---|---|---|
| JP | 2005-309185 A | 11/2005 |
| JP | 2007-208828 A | 8/2007 |
| JP | 2008-42390 A | 2/2008 |
| JP | 2008-242261 A | 10/2008 |
| JP | 2008-275987 A | 11/2008 |
| JP | 2010-156825 A | 7/2010 |
| JP | 2010-286627 A | 12/2010 |
| WO | WO 2008/004486 A1 | 1/2008 |

* cited by examiner

ONBOARD INFORMATION DEVICE

TECHNICAL FIELD

The present invention relates to an onboard information device that continually recognizes speech contents of a passenger to support conversation in a vehicle.

BACKGROUND ART

As for conversation in a vehicle in general, there is a problem in that engine noise, tire noise, or noise from outside the vehicle can cause the conversation contents to be lost. Accordingly, techniques to improve the problem have been proposed conventionally. For example, Patent Document 1 discloses an in-vehicle conversation support system that picks up conversation in a vehicle with a microphone, and enables listening it through a loud speaker.

However, the conventional in-vehicle conversation support system disclosed in the Patent Document 1, for example, is conversation support by voice. Accordingly, it has a problem in that when the voice output from the speaker is missed, it cannot solve the problem. In addition, since it uses voice data, the contents cannot be confirmed unless it is played back thereafter. Furthermore, it is likely that howling can occur because of picking up the sound with the microphone and outputting from the speaker.

Accordingly, it is conceivable to pick up conversation in the vehicle with a microphone, and provides the conversation contents in character strings.

As techniques relevant to the subject, various devices have been proposed which pick up speech contents in the conference with a microphone, and automatically record minutes. For example, Patent Document 2 discloses a voice recognition device and conferencing system capable of recording minute data that reproduces speech contents of each of the talkers.

PRIOR ART DOCUMENT

Patent Document

Patent Document 1: Japanese Patent Laid-Open No. 2008-42390.

Patent Document 2: Japanese Patent Laid-Open No. 2008-275987.

DISCLOSURE OF THE INVENTION

Problems to be Solved by the Invention

However, although the conventional voice recognition device and conferencing system disclosed in the Patent Document 2, for example, can record the voice as character strings, since it is a conferencing system, it does not suppose to be used in a vehicle or as the in-vehicle conversation support. Accordingly, it does not consider a conventional problem during driving of a vehicle in that the engine noise, tire noise, or noise from outside the vehicle can interfere with the conversation contents and cause to fail to catch them. In addition, it does not consider to prepare real-time conversation support for those who fail to catch the conversation contents. Consequently, even if the voice recognition device and conferencing system disclosed in the Patent Document 2, for example, is applied to an onboard information device, it cannot solve the problems peculiar to the vehicle.

The present invention is implemented to solve the foregoing problems. Therefore it is an object of the present invention to provide an onboard information device capable of carrying out effective conversation support in real time in accordance with a recognition result of continuous recognition of the conversation contents in a vehicle.

Means for Solving the Problems

To accomplish the foregoing problems, an onboard information device in accordance with the present invention which is mounted on a vehicle to provide information for supporting a passenger comprises: a voice acquisition unit that continually detects and acquires voice the passenger utters while the onboard information device is in operation; a voice recognition unit that recognizes speech contents of the voice acquired by the voice acquisition unit; a keyword extraction unit that extracts a prescribed keyword from the speech contents recognized by the voice recognition unit; a vehicle state detector that detects a vehicle state including an environmental state in the vehicle, a surrounding state of the vehicle or an operating state of the vehicle; and an output controller that creates display data or voice data from the speech contents recognized by the voice recognition unit in accordance with the vehicle state detected by the vehicle state detector and the keyword extracted by the keyword extraction unit, and that carries out output control of the display data or voice data to an output unit.

Advantages of the Invention

According to the onboard information device in accordance with the present invention, it can carry out effective conversation support in real time on the basis of the recognition result of the continual recognition of the speech contents of a passenger (a speaker such as a fellow passenger).

BEST MODE FOR CARRYING OUT THE INVENTION

The best mode for carrying out the invention will now be described with reference to the accompanying drawings.

Embodiment 1

According to the present invention, an onboard information device of an onboard navigation system, onboard audio system, onboard video system or the like continually recognizes the speech contents of a passenger in a vehicle while the onboard information device is active, and carries out conversation support in real time on the basis of the recognition result. This also fits to the following embodiments.

Figure 1:
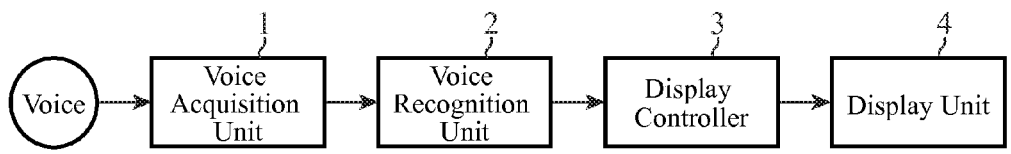
FIG. 1 is a block diagram showing a basic configuration of an onboard information device of an embodiment 1.

FIG. 1 is a block diagram showing a basic configuration of an onboard information device of an embodiment 1 in accordance with the present invention. The onboard information device comprises a voice acquisition unit 1, a voice recognition unit 2, a display controller (output controller) 3, and a display unit (output unit) 4. In addition, although not shown in the drawing, the onboard information device also comprises a key input unit that acquires an input signal using keys, a touch screen or the like.

The voice acquisition unit 1 carries out A/D conversion of speech of a passenger picked up with a microphone in a vehicle, that is, the voice input by the speech of a passenger in the vehicle, and acquires it in a PCM (Pulse Code Modulation) format, for example. In addition, in the environment in the vehicle, since music, guidance voice and the like are output from an onboard audio or car navigation, it is assumed here that these sounds undergo such processing that will prevent the voice acquisition unit 1 from acquiring them using a common echo cancellation technique using an FIR (Finite Impulse Response) filter.

The voice recognition unit 2 has a recognition dictionary (not shown), detects a voice-active section corresponding to speech contents a passenger utters from the voice data acquired by the voice acquisition unit 1, extracts features of the voice data in the voice-active section, carries out the recognition processing using the recognition dictionary on the basis of the features, and outputs a character string of the voice recognition result. Incidentally, as the recognition processing, it is possible to use an ordinary method such as an HMM (Hidden Markov Model), for example. In addition, as the voice recognition unit 2, a voice recognition server on a network can also be used.

By the way, it is general for the voice recognition function mounted on a car navigation system or the like to cause a passenger to specify (instruct) a start of speech to the system. To achieve this, a button or the like for instructing the voice recognition start (referred to as a "voice recognition start instruction unit" from now on) is displayed on a touch screen or mounted on the steering wheel. Then, after the passenger pushes down the voice recognition start instruction unit, the voice uttered is recognized. More specifically, when the voice recognition start instruction unit outputs the voice recognition start signal, and the voice recognition unit receives the signal, it detects a voice-active section corresponding to the contents of the speech of the passenger from the voice data acquired by the voice acquisition unit, and executes the recognition processing described above.

The voice recognition unit 2 of the present embodiment 1, however, continually recognizes the contents the passenger utters even if the passenger issues no voice recognition start instruction. More specifically, even if the voice recognition unit 2 does not receive the voice recognition start signal, it repeatedly carries out the processing of detecting the voice-active section corresponding to the contents the passenger utters from the voice data acquired by the voice acquisition unit 1, extracting the features of the voice data in the voice-active section, executing the recognition processing using the recognition dictionary based on the features, and outputting the character string of the voice recognition result. Incidentally, this also applies to the embodiments described below.

The display controller 3 creates the display data of the speech contents of the passenger which are the voice recognition result of the voice recognition unit 2, and arranges the display data in a time-series order, for example.

The display unit 4 displays the display data generated by the display controller 3, and is comprised of the display screen of a navigation system, the display unit on the dashboard, a windshield, and a rear seat entertainment (RSE) or the like, for example.

Figure 2:
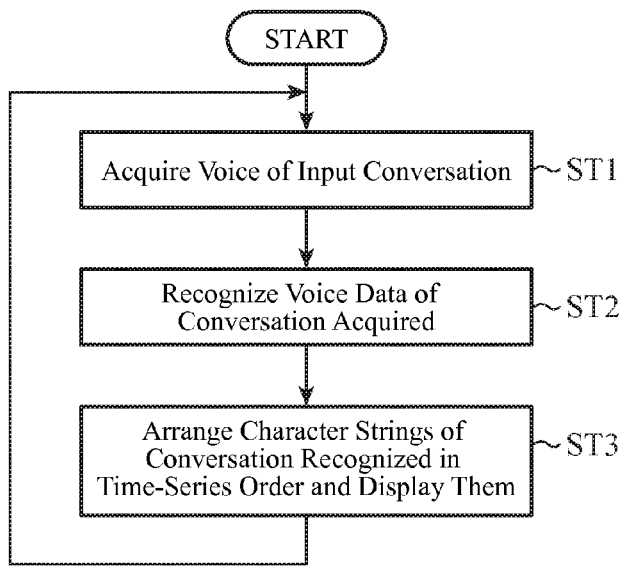
FIG. 2 is a flowchart showing a basic operation of the onboard information device of the embodiment 1.

Next, the basic operation of the onboard information device will be described. FIG. 2 is a flowchart showing the basic operation of the onboard information device of the embodiment 1. Incidentally, the following processing is carried out continually during the operation of this device (onboard information device).

First, if any speech input takes place, the voice acquisition unit 1 acquires the input voice, and carries out A/D conversion to obtain the voice data of a PCM format, for example (step ST1). Next, the voice recognition unit 2 recognizes the voice data obtained by the voice acquisition unit 1 (step ST2). Then the display controller 3 creates the display data by arranging the character strings of the voice recognition result by the voice recognition unit 2 in a time-series order, and delivers the display data to the display unit 4, thereby being able to display the conversation contents in the character strings on the display unit 4 (step ST3) (see FIG. 12 of an embodiment 4 that will be described later).

Figure 3:
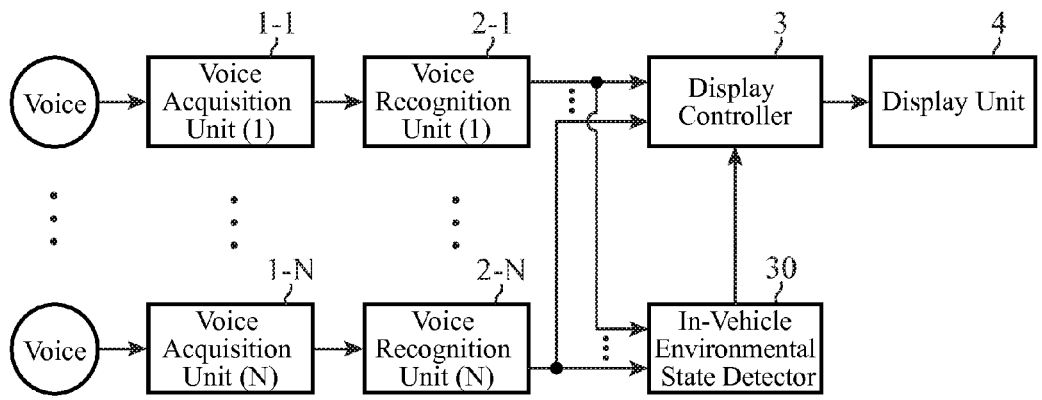
FIG. 3 is a block diagram showing a configuration of an onboard information device of the embodiment 1.

FIG. 3 is a block diagram showing a configuration of an onboard information device of the embodiment 1 in accordance with the present invention. Incidentally, the same components as those of the basic configuration shown in FIG. 1 are designated by the same reference numerals and their duplicate description will be omitted. As compared with the basic configuration shown in FIG. 1, the following embodiment 1 is provided with a plurality of (N) microphones for N passengers by considering that a plurality of passengers are in the vehicle, and comprises an in-vehicle environmental state detector (vehicle state detector) 30 that detects the position of speech of each passenger.

Then the onboard information device of the present embodiment 1 comprises voice acquisition units 1 (1-1, 1-2, ..., 1-N) by the number of the passengers (microphones) N, voice recognition units 2 (2-1, 2-2, ..., 2-N) corresponding to them, the in-vehicle environmental state detector (vehicle state detector) 30, the display controller (output controller) 3 and the display unit (output unit) 4. Thus, it comprises a plurality of pairs of the voice acquisition units 1 and voice recognition units 2, each of which is provided for each passenger in the vehicle.

The in-vehicle environmental state detector (vehicle state detector) 30 in the embodiment 1 in accordance with the present invention detects as the environmental state in the vehicle the located state of the voice acquisition units 1 (1-1, 1-2, ..., 1-N) provided for the individual passengers, thereby being able to detect the position of speech of each passenger.

In addition, the display controller 3 (output controller) generates from the voice recognition result by the voice recognition unit 2 the display data and carries out output control thereof as the speech contents corresponding to the speech position of each passenger detected by the in-vehicle environmental state detector (vehicle state detector) 30. For example, it creates the display data in a mode that enables identification of the plurality of passengers by arranging the display data in a time-series order for each passenger.

Figure 4:
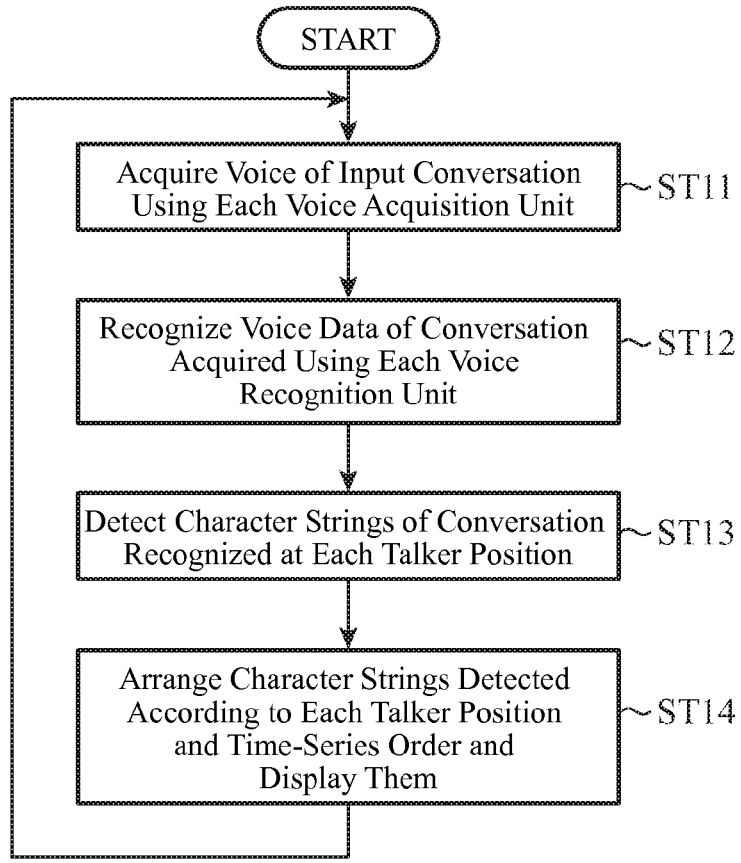
FIG. 4 is a flowchart showing the operation of the onboard information device of the embodiment 1.

Next, the operation of the onboard information device of the present embodiment 1 will be described. FIG. 4 is a flowchart showing the operation of the onboard information device of the embodiment 1.

First, if any speech is input, each voice acquisition unit 1 (1-1, 1-2, ..., 1-N) acquires the input voice, and carries out A/D conversion to obtain the voice data of a PCM format, for example (step ST11). Next, each voice recognition unit 2 (2-1, 2-2, ..., 2-N) recognizes the voice data obtained by the corresponding voice acquisition unit 1 (step ST12). Then, the in-vehicle environmental state detector 30 detects a character string resulting from the voice recognition by every voice recognition unit 2 for each voice recognition unit 2, that is, for each position of the passengers in accordance with the position of each voice acquisition unit 1 corresponding to each voice recognition unit 2 (step ST13), and the display controller 3 arranges them according to each position of the passengers and in a time-series order to create the display data, and delivers the display data to the display unit 4. Thus, the display unit 4 displays the conversation contents in the character strings (step ST14).

Figure 5:
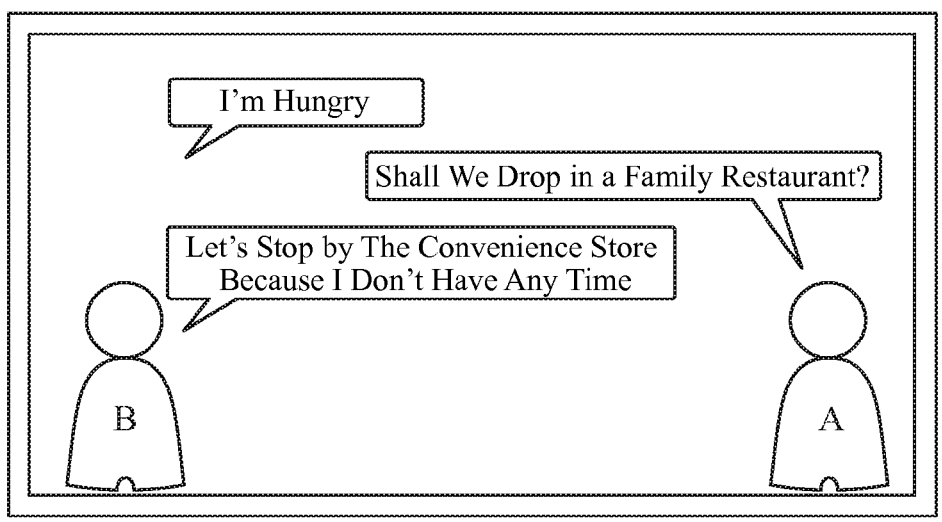
FIG. 5 is a diagram showing a display example of conversation contents displayed on a display unit.

FIG. 5 is a diagram showing an example of the conversation contents displayed on the display unit 4. In this example, conversation between a driver A and a fellow passenger B in the passenger seat is arranged in the time-series order with each speech at the positions of the passengers being separated. More specifically, they are displayed in a layout that will enable identification of the plurality of passengers who utter speech.

This enables confirming the conversation contents and makes it easier to understand the flow of the conversation even if engine noise, tire noise, or noise from outside the vehicle can cause missing a word of the conversation contents or even when the driver cannot catch a word accidentally because of concentration on driving.

Incidentally, although FIG. 5 shows an example in which the display controller (output controller) 3 outputs the display data in different modes that will enable identifying the plurality of passengers who deliver speech by changing a layout of the display characters on the screen for the individual passengers, this is not essential. For example, it is also possible to create and display as the display data in different modes the display data that differs in one of the type, form, size, color, density, brightness, and layout on the screen of the display characters or display image. It is assumed that this also applies to the following embodiments.

As described above, according to the present embodiment 1, the onboard information device continually carries out voice acquisition and voice recognition throughout its operation even if the passengers do not notice, and performs, if any speech occurs, the voice acquisition and voice recognition automatically, and arranges and outputs the voice recognition result in the character strings in the time-series order. Accordingly, it is not necessary for the passengers to make any manual operation or intentional input to start the voice acquisition and voice recognition, and even if they cannot catch the conversation contents accidentally because of noise or concentration on driving, they can confirm the conversation contents.

In addition, since it continually catches the in-vehicle conversation for each passenger, carries out voice recognition, detects the speech position of each passenger separately, and arranges and presents them, it can enable the driver and passengers to confirm the conversation contents and make it easier for them to understand the flow of the conversation even if they cannot catch the conversation because of noise or concentration on driving. In addition, since it can carry out voice recognize for the individual passengers, it can improve the voice recognition rate when they talk at the same time.

Embodiment 2

Figure 6:
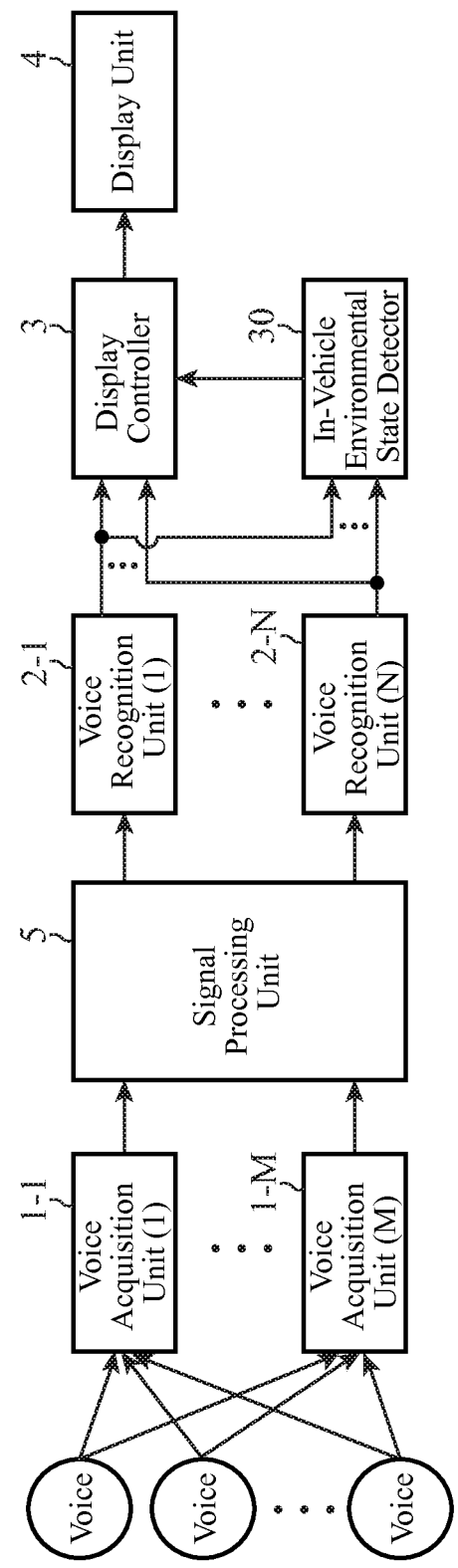
FIG. 6 is a block diagram showing a configuration of an onboard information device of an embodiment 2.

FIG. 6 is a block diagram showing a configuration of an onboard information device of an embodiment 2 in accordance with the present invention. Incidentally, the same components as those described in the embodiment 1 are designated by the same reference numerals and their duplicate description will be omitted. Compared with the configuration of the embodiment 1 shown in FIG. 3, the embodiment 2 differs in that the voice acquisition unit 1 is comprised of an array microphone in which M microphones (1-1, 1-2, ..., 1-M) are disposed in an array, and that a signal processing unit 5 is added. More specifically, in the onboard information device of the present embodiment 2, the voice acquisition units 1 (1-1, 1-2, ..., 1-M) in which M microphones are disposed in an array acquire voices (sound sources), and the signal processing unit 5 separates the sound sources into N, and each of the N voice recognition units carries out voice recognition of the speech contents of one of the N passengers.

In the present embodiment 2, the number of microphones in the array microphone is M for the N passengers, and the microphones are not provided for the individual passengers who talk. However, the signal processing unit 5 separates the voice data acquired from the array microphone with M microphones disposed in an array into N (N is the number of passengers) sound sources using ordinary sound source separation such as beamforming. As for the sound source separation, although it will be not described here because it is a well-known technique, it is assumed in the following embodiments that the "sound source separation" is carried out using such a common sound source separation.

Then, the in-vehicle environmental state detector (vehicle state detector) 30 in the embodiment 2 in accordance with the present invention is a detector that detects as the environmental state in the vehicle the position of speech of each of the N passengers, that is, the located state of the passengers from the N sound sources separated by the signal processing unit 5.

In addition, the display controller 3 (output controller) generates the display data from the voice recognition result by the voice recognition unit 2 and carries out output control thereof as the speech contents corresponding to the speech position of each passenger detected by the in-vehicle environmental state detector (vehicle state detector) 30. For example, it creates the display data in such a mode that enables identification of the plurality of passengers by arranging the display data in a time-series order for each passenger.

Figure 7:
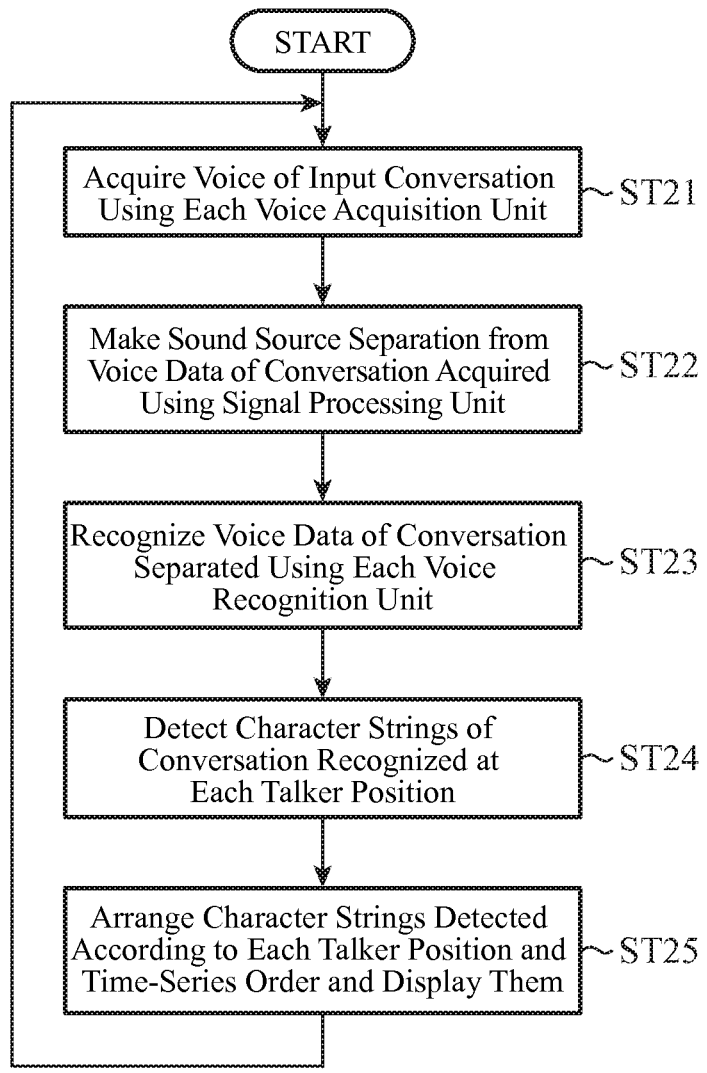
FIG. 7 is a flowchart showing the operation of the onboard information device of the embodiment 2.

Next, the operation of the onboard information device of the present embodiment 2 will be described. FIG. 7 is a flowchart showing the operation of the onboard information device of the embodiment 2.

First, if any speech is input, each voice acquisition unit 1 (1-1, 1-2, . . . , 1-M) acquires the input voice, and carries out A/D conversion to obtain the voice data of a PCM format, for example (step ST21). Next, the signal processing unit 5 carries out the sound source separation of the voice data obtained by the voice acquisition unit 1 into N parts (corresponding to the number of passengers N) (step ST22). Each corresponding voice recognition unit 2 (2-1, 2-2, . . . , 2-N) recognizes the voice data of the conversation separated into N sound sources (step ST23). Then, the in-vehicle environmental state detector 30 detects for each position of the passengers each character string resulting from the voice recognition by each voice recognition unit 2 (step ST24), and the display controller 3 arranges them according to each position of the passengers and in a time-series order to create the display data, and delivers the display data to the display unit 4. Thus, the display unit 4 displays the conversation contents in the character strings (step ST25).

A display example thus displayed is the same as that of FIG. 5 shown in the embodiment 1, in which conversation between a driver A and a fellow passenger B in the passenger seat is arranged in the time-series order with the speech at each position of the passengers being separated.

This enables confirming the conversation contents and makes it easier to understand the flow of the conversation even if engine noise, tire noise, or noise from outside the vehicle causes missing a word of the conversation contents or even when the driver cannot catch a word accidentally because of concentration on driving.

As described above, according to the present embodiment 2, it comprises the array microphone that includes a plurality of microphones disposed in an array in the vehicle, carries out voice recognition by continually catching the conversation in the vehicle, and presents the recognition results after arranging them for each passenger. Accordingly, as the embodiment 1, even if they cannot catch the conversation contents accidentally because of noise or concentration on driving, it enables them to confirm the conversation contents, and to make it easier for them to understand the flow of the conversation. In addition, since it can recognize voices of the individual passengers, it can improve the voice recognition rate when they talk at the same time.

Embodiment 3

Figure 8:
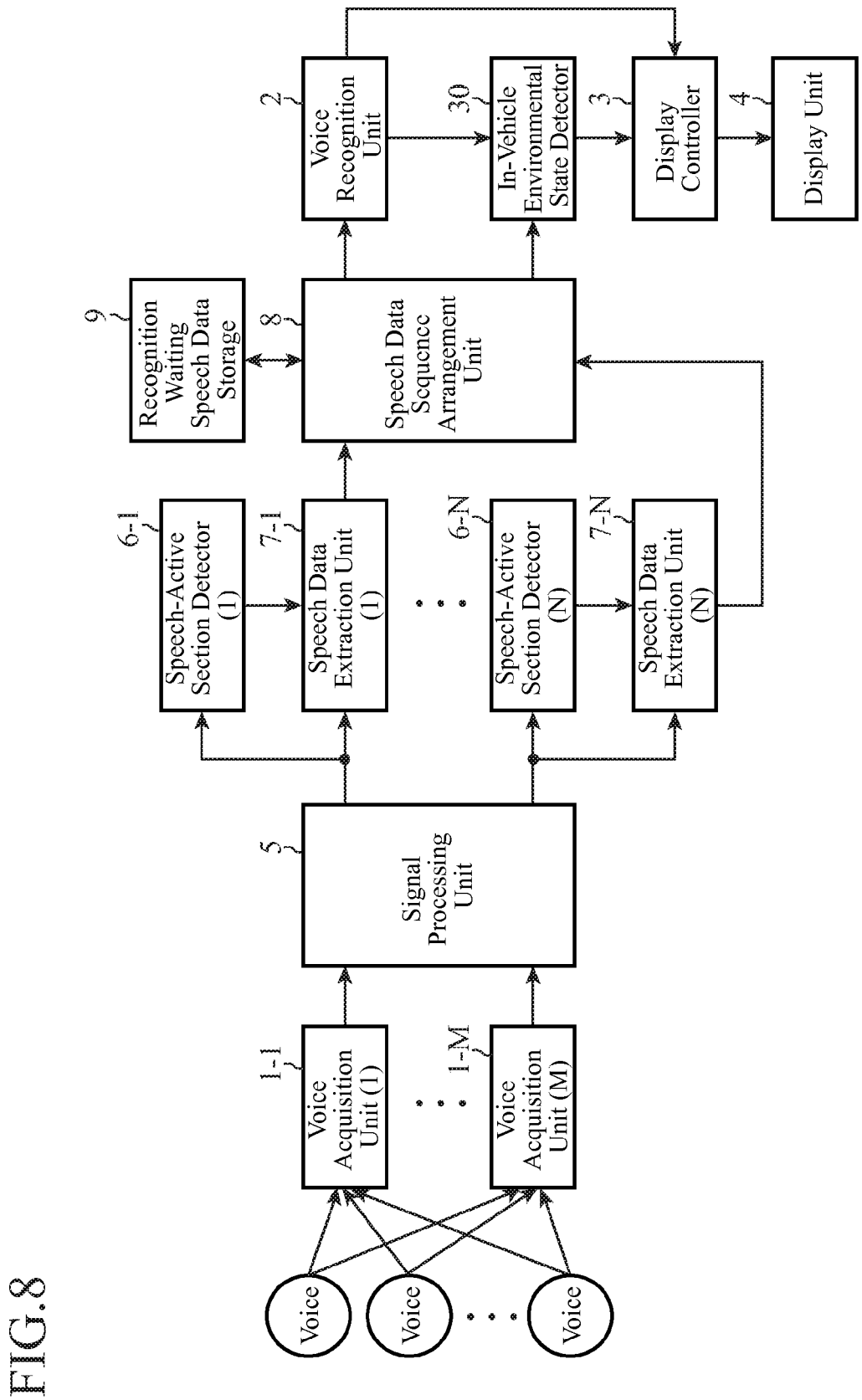
FIG. 8 is a block diagram showing a configuration of an onboard information device of an embodiment 3.

FIG. 8 is a block diagram showing a configuration of an onboard information device of an embodiment 3 in accordance with the present invention. Incidentally, the same components as those described in the embodiments 1 and 2 are designated by the same reference numerals and their duplicate description will be omitted. Compared with the configuration of the embodiment 2 shown in FIG. 6, the following embodiment 3 differs in that it further comprises N speech-active section detectors 6 and N speech data extraction units 7 corresponding to the N voice data passing through the separation by the signal processing unit 5, a speech data sequence arrangement unit 8, and a recognition waiting speech data storage 9, and that the voice recognition unit 2 is only one.

Incidentally, although the present embodiment 3 has the configuration that employs the array microphone with M microphones disposed in an array as the embodiment 2, a configuration is also possible which comprises N microphones each of which is provide for one of the passengers as the configuration shown in FIG. 3 of the embodiment 1.

The speech-active section detector 6 detects a voice-active section of the voice data separated for each position of the passengers output from the signal processing unit 5, and when the speech is detected, it instructs the speech data extraction unit 7 to extract the speech data of the voice-active section detected.

The speech data extraction unit 7 extracts the voice-active section instructed by the speech-active section detector 6 from the voice data separated for each position of the passengers output from the signal processing unit 5, and delivers the speech data (voice data) extracted to the speech data sequence arrangement unit 8.

The speech data sequence arrangement unit 8 receives the speech data from the speech data extraction unit 7, and at the same time decides the position of the passenger who talks according to from which of the speech data extraction units 7 it receives the speech data, and delivers the speech data (voice data) to the voice recognition unit 2 and the position information on the passenger to the in-vehicle environmental state detector (vehicle state detector) 30 at the post-stage. However, if the voice recognition unit 2 has not yet completed the voice recognition processing of the previous voice data, the speech data sequence arrangement unit 8 temporarily delivers the speech data and the position information on the passenger who talks to the recognition waiting speech data storage 9, acquires the speech data (voice data) and the position information on the passenger who talks from the recognition waiting speech data storage 9 after the voice recognition unit 2 has completed the previous voice recognition processing, and delivers them to the voice recognition unit 2 and the in-vehicle environmental state detector (vehicle state detector) 30.

The recognition waiting speech data storage 9 stores in a queue (FIFO (First In First Out)) the speech data and the position information on the passenger who talks delivered from the speech data sequence arrangement unit 8, and sends the speech data and the position information on the passenger who talks back to the speech data sequence arrangement unit 8 when an acquisition request is sent therefrom.

Then, the in-vehicle environmental state detector (vehicle state detector) 30 in the embodiment 3 in accordance with the present invention is a detector that detects as the environmental state in the vehicle the position of speech of each of the N passengers, that is, the located state of the passengers by searching the speech data (voice data) acquired and arranged by the speech data sequence arrangement unit 8.

In addition, the display controller 3 (output controller) arranges the voice recognition results which are the speech contents recognized by the voice recognition unit 2 for each position of the passengers in accordance with the located state (speech position information) of the passengers received from the in-vehicle environmental state detector (vehicle state detector) 30, creates the display data in the mode that enables identification of the plurality of passengers who talk by arranging the data in a time-series order for each passenger, for example, and carries out output control of the contents exhibited on the display unit 4.

Figure 9:
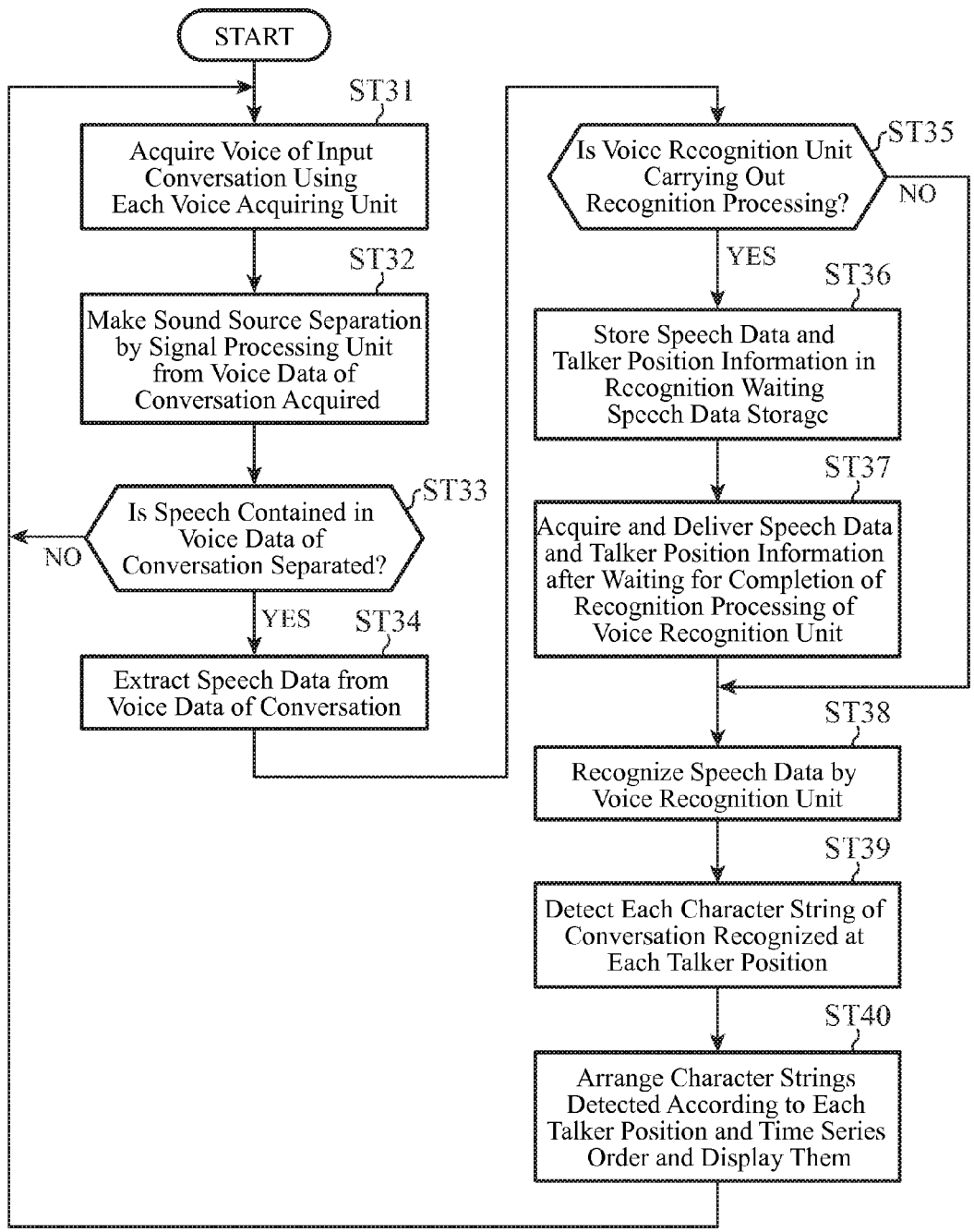
FIG. 9 is a flowchart showing the operation of the onboard information device of the embodiment 3.

Next, the operation of the onboard information device of the present embodiment 3 will be described. FIG. 9 is a flowchart showing the operation of the onboard information device of the embodiment 3.

First, if any speech is input, each voice acquisition unit 1 (1-1, 1-2, . . . , 1-M) acquires the input voice, and carries out A/D conversion to obtain the voice data of a PCM format, for example (step ST31). Next, the signal processing unit 5 carries out the sound source separation of the voice data obtained by the voice acquisition unit 1 into N parts (corresponding to the number of passengers N) (step ST32). Each speech-active section detector 6 (6-1, 6-2, . . . , 6-N) detects on whether the voice data of the conversation separated into N sound sources contain the speech or not (step ST33). As for the detection of the speech-active section, it can be performed using the voice-active section detection that detects the volume level of the voice for each voice data.

Unless the speech is detected (NO at step ST33), the processing returns to step ST31. On the other hand, if the speech is detected (YES at step ST33), the speech-active section detector 6 instructs the speech data extraction unit 7 (7-1, 7-2, . . . , 7-N) to extract the voice-active section from each voice data which passes through the N separation and is received from the signal processing unit 5. Then the speech data extraction unit 7 executes the extraction processing, and delivers the speech data extracted to the speech data sequence arrangement unit 8 (step ST34).

Then, unless the voice recognition unit 2 is carrying out the voice recognition processing (NO at step ST35), the voice recognition unit 2 executes the voice recognition processing of the speech data (step ST38). On the other hand, if the voice recognition unit 2 is carrying out the previous voice recognition processing (YES at step ST35), the speech data sequence arrangement unit 8 temporarily stores in the recognition waiting speech data storage 9 the speech data expected to be sent from the speech data sequence arrangement unit 8 to the voice recognition unit 2 and the position information on the passenger expected to be sent to the display controller 3 (step ST36).

After that, waiting for the voice recognition unit 2 to complete the voice recognition processing and as soon as it has completed the voice recognition processing, the speech data sequence arrangement unit 8 acquires the speech data and the position information on the passenger stored in the recognition waiting speech data storage 9, and delivers them to the voice recognition unit 2 and to the in-vehicle environmental state detector 30 (step ST37). Then, the voice recognition unit 2 executes the voice recognition processing of the speech data (step ST38).

Finally, the in-vehicle environmental state detector 30 detects each character string of the voice recognition result by the voice recognition unit 2 for each position of the passengers according to the position information on the passengers received from the speech data sequence arrangement unit 8 (step ST39), and the display controller 3 arranges them to create the display data in which they are arranged according to each position of the passengers and in a time-series order, and delivers the display data to the display unit 4 so that the display unit 4 displays the conversation contents in the character strings (step ST40).

A display example thus displayed is the same as that of FIG. 5 shown in the embodiment 1, in which the conversation between a driver A and a fellow passenger B in the passenger seat is arranged in the time-series order with each speech at the positions of the passengers being separated.

This makes it possible to confirm the conversation contents and makes it easier to understand the flow of the conversation even if the engine noise, tire noise, or noise from outside the vehicle causes missing a word of the conversation contents or even when the driver cannot catch a word accidentally because of concentration on driving.

As described above, according to the present embodiment 3, since it can reduce the number of the voice recognition units 2 to one unit, it offers besides the same advantages of the embodiments 1 and 2 an advantage of being able to reduce the resources the voice recognition unit 2 requires, and to improve the performance of the voice recognition unit 2 by utilizing a portion corresponding to the reduction of the resources.

Embodiment 4

Figure 10:
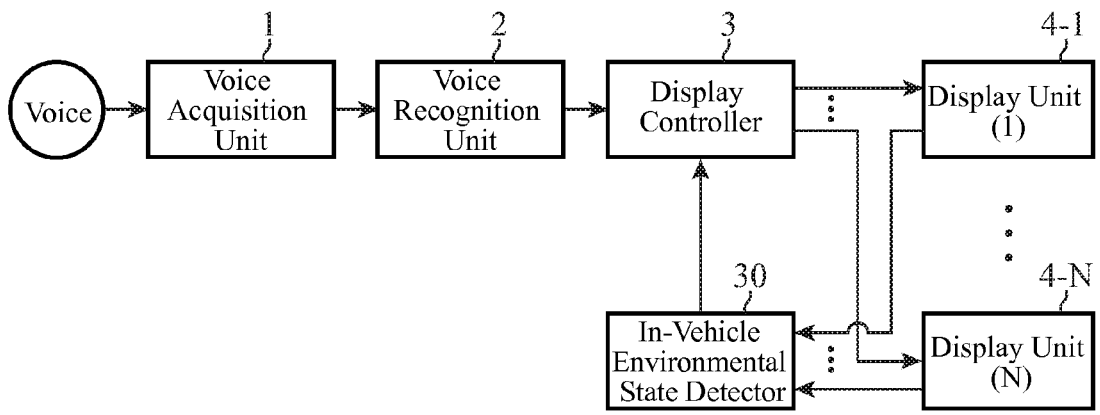
FIG. 10 is a block diagram showing a configuration of an onboard information device of an embodiment 4.

FIG. 10 is a block diagram showing a configuration of an onboard information device of an embodiment 4 in accordance with the present invention. Incidentally, the same components as those described in the embodiments 1-3 are designated by the same reference numerals and their duplicate description will be omitted. Compared with the basic configuration shown in FIG. 1 described in the embodiment 1, the following embodiment 4 differs in that it comprises a plurality of (N) display units 4 and an in-vehicle environmental state detector (vehicle state detector) 30 that detects the position of each display unit 4 (4-1, 4-2, . . . , 4-N). Then, when displaying recognized voice data in character strings, it displays them by altering the display format (display contents) in accordance with the position of each display unit 4 (4-1, 4-2, . . . , 4-N) detected by the in-vehicle environmental state detector (vehicle state detector) 30.

Thus, the in-vehicle environmental state detector (vehicle state detector) 30 in the embodiment 4 in accordance with the present invention is provided for detecting the located state of the display units 4 (4-1, 4-2, . . . , 4-N) as the environmental state in the vehicle.

In addition, the display controller 3 (output controller) creates the display data in a different display mode according to the located state of the display units 4 (4-1, 4-2, . . . , 4-N) detected by the in-vehicle environmental state detector (vehicle state detector) 30, that is, according to whether the display unit 4 is placed at the driver's seat or at the passenger seat, for example, and carries out output control of the exhibited contents to the display unit 4.

Figure 11:
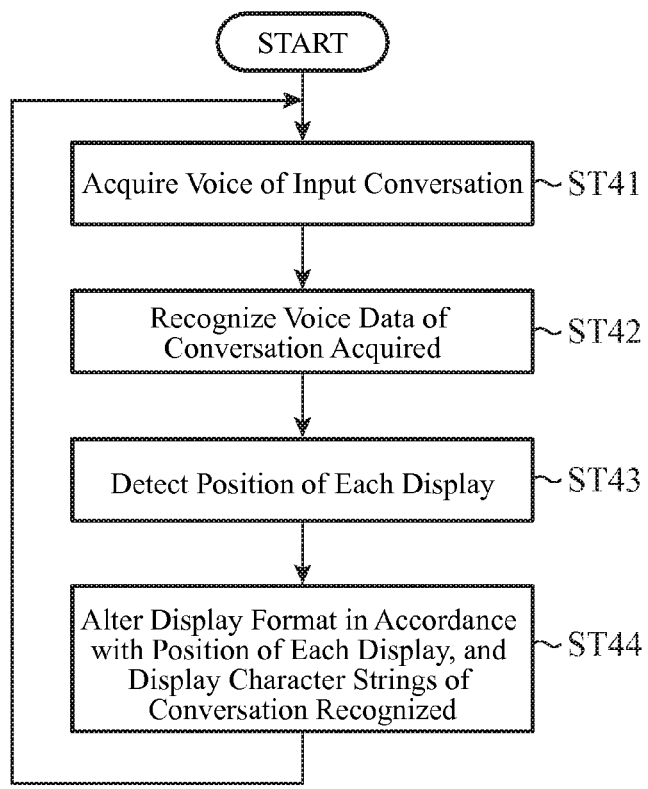
FIG. 11 is a flowchart showing the operation of the onboard information device of the embodiment 4.

Next, the operation of the onboard information device of the present embodiment 4 will be described. FIG. 11 is a flowchart showing the operation of the onboard information device of the embodiment 4.

First, if any speech input takes place, the voice acquisition unit 1 acquires the input voice, and carries out A/D conversion to obtain the voice data of a PCM format, for example (step ST41). Next, the voice recognition unit 2 recognizes the voice data obtained by the voice acquisition unit 1 (step ST42). On the other hand, the in-vehicle environmental state detector (vehicle state detector) 30 detects the position of each display unit 4 (4-1, 4-2, . . . , 4-N) (step ST43). Then, the display controller 3 creates the display data by arranging the character strings of the voice recognition result of the voice recognition unit 2 in a time-series order and by altering the display format (display contents) in accordance with the position of each display unit 4 (4-1, 4-2, . . . , 4-N) detected by the in-vehicle environmental state detector (vehicle state detector) 30, and delivers the display data to the individual display units 4. Thus, each display unit 4 displays the conversation contents in the character strings (step ST44).

Figure 12:
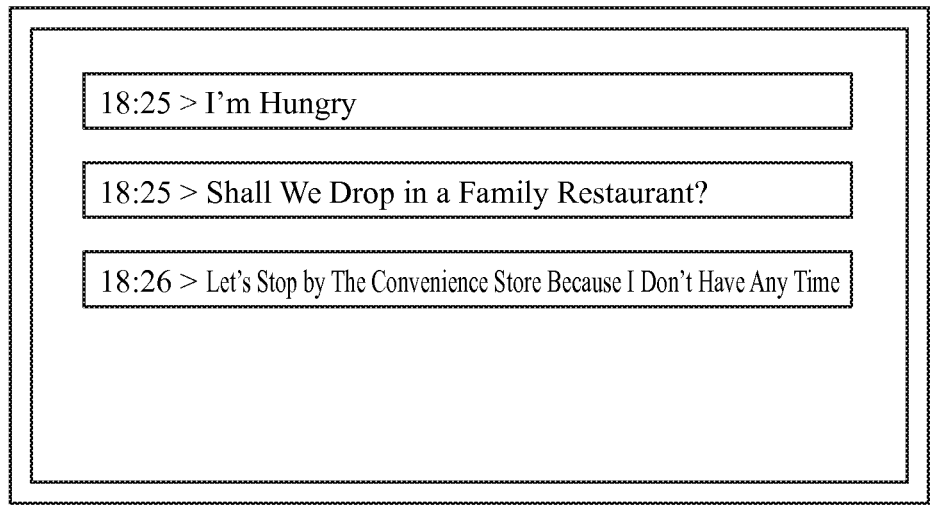
FIG. 12 is a display example when a display unit is installed at the passenger seat.
Figure 13:
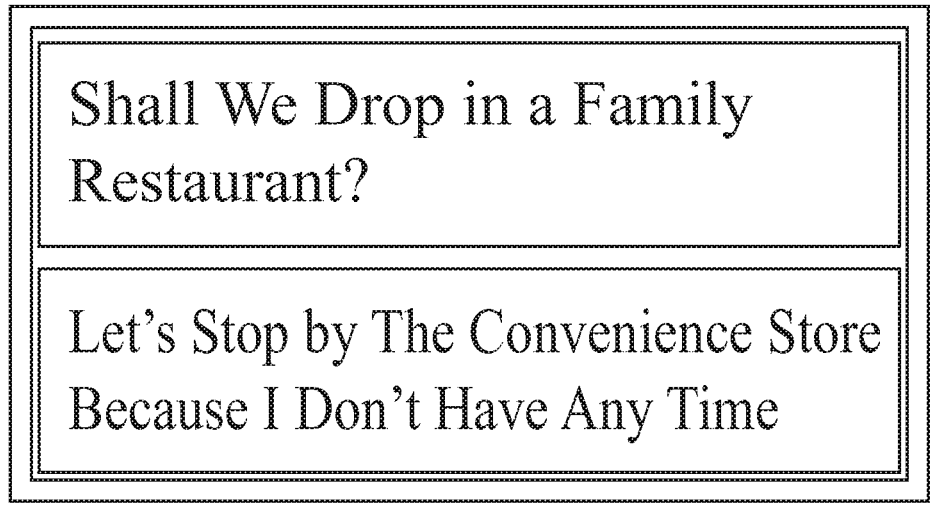
FIG. 13 is a display example when the display unit is installed at the driver's seat.

FIG. 12 and FIG. 13 are diagrams showing display examples displayed in that way. FIG. 12 is a display example when the position of the display unit 4 is at the passenger seat, and FIG. 13 is a display example when the position of the display unit 4 is at the driver's seat. In the examples, the display unit 4 at the passenger seat shown in FIG. 12 displays a plurality of lines (five lines or so at the same time in accordance with the time of speech in the example) of all the conversation in a time-series order. On the other hand, the display unit 4 at the driver's seat shown in FIG. 13 displays only two lines all over the screen (without speech time). This is because the driver must concentrate on driving and unless the characters are large enough, he or she cannot confirm the conversation contents in a short time.

Figure 14:
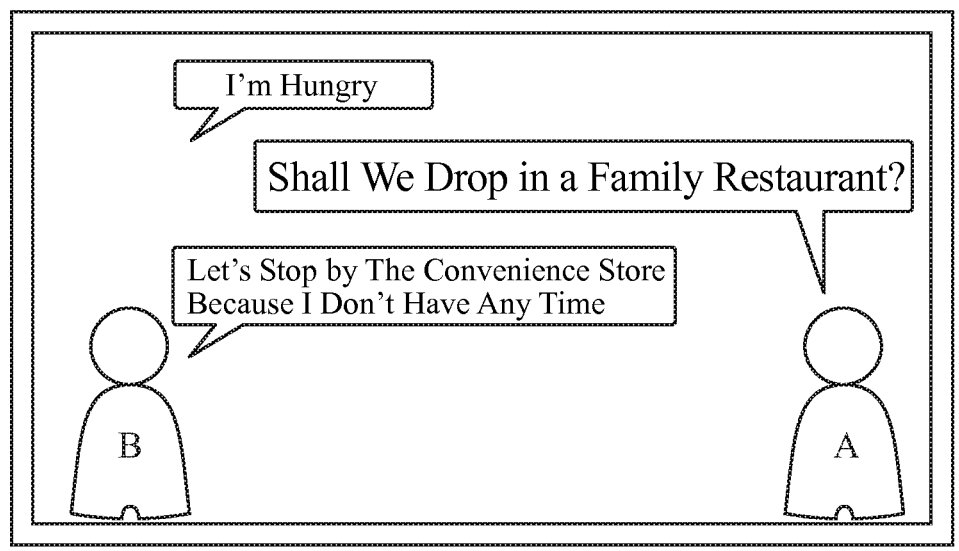
FIG. 14 is another display example when the display unit is installed at the passenger seat.

Alternatively, when it is possible to acquire the position of the passengers as in the embodiments 1-3 using a plurality of microphones or the array microphone, the display unit 4 at the passenger seat, for example, can display a screen as shown in FIG. 14 instead of FIG. 12. In this case, displaying the speech contents of the other persons greater than the speech contents of oneself (B) at the passenger seat makes it easier to recognize the conversation of the other persons.

As described above, according to the present embodiment 4, it continually catches the conversation in the vehicle to carry out the voice recognition, and displays optimally for each position of the display units such as displaying on the display unit at the driver's seat in a manner that the characters can be confirmed visually in a short time, for example, or displaying on the display unit at the passenger seat in a manner that it will provide greater amount of information because there is no such restriction as on the driver. Accordingly, it can facilitate understanding the display contents. In addition, displaying by considering the position of the passenger can make it easier for him or her to recognize the conversation of the other persons.

Embodiment 5

Figure 15:
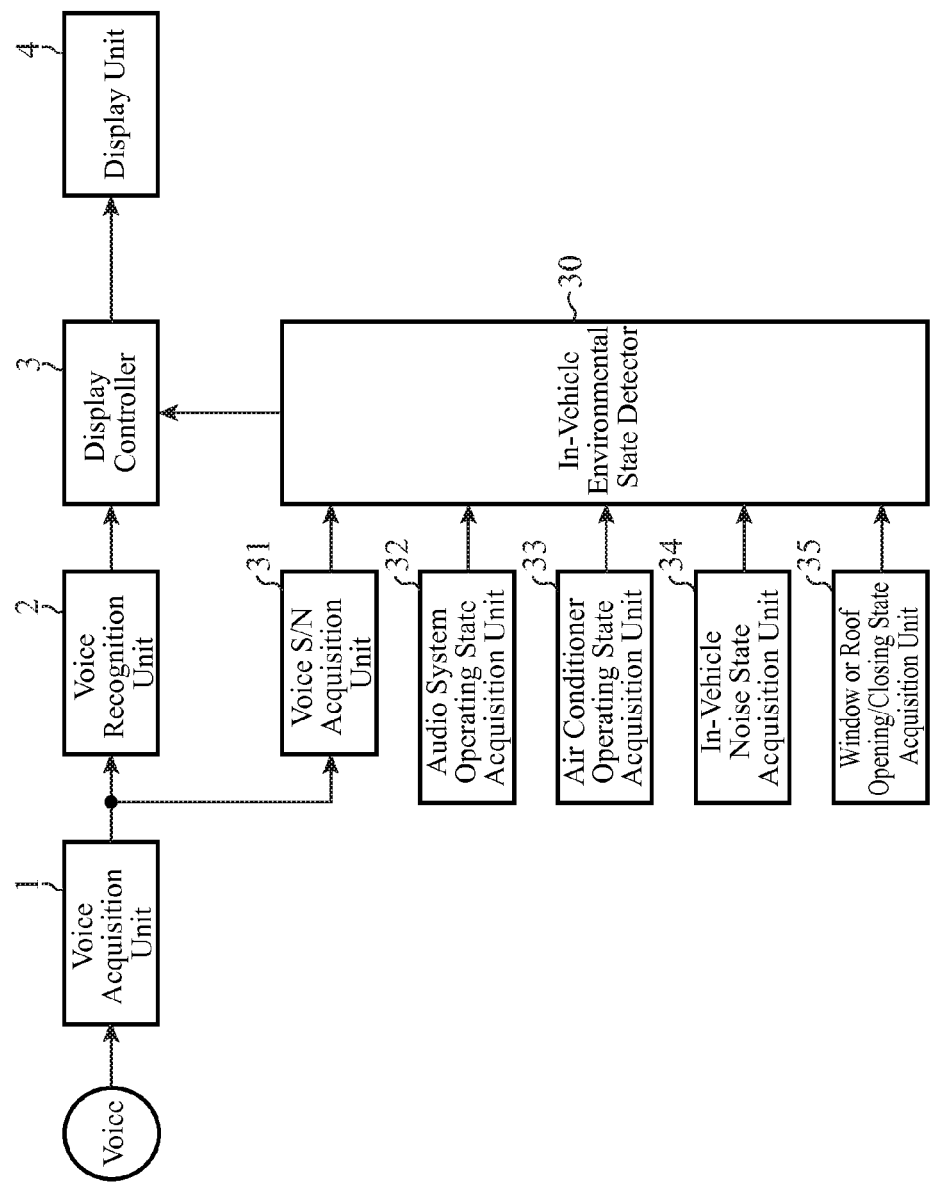
FIG. 15 is a block diagram showing a configuration of an onboard information device of an embodiment 5.

FIG. 15 is a block diagram showing a configuration of an onboard information device of an embodiment 5 in accordance with the present invention. Incidentally, the same components as those described in the embodiments 1-4 are designated by the same reference numerals and their duplicate description will be omitted. Compared with the basic configuration shown in FIG. 1 described in the embodiment 1, the following embodiment 5 differs in that it comprises an in-vehicle environmental state detector (vehicle state detector) 30, a voice S/N acquisition unit 31, an audio system operating state acquisition unit 32, an air conditioner operating state acquisition unit 33, an in-vehicle noise state acquisition unit 34, and a window or roof opening/closing state acquisition unit 35.

The voice S/N acquisition unit 31 detects a voice-active section from the voice data acquired from the voice acquisition unit 1, and calculates the ratio between the signal level in the voice-active section and the signal level in the other sections.

The audio system operating state acquisition unit 32 and the air conditioner operating state acquisition unit 33 acquire the operating state of an audio system such as in-vehicle audio equipment and that of the air-conditioning equipment such as an air conditioner.

The in-vehicle noise state acquisition unit 34 acquires a noise state as to whether the in-vehicle noise level exceeds a prescribed threshold or not.

The window or roof opening/closing state acquisition unit 35 acquires the window or roof opening/closing state of the vehicle from the CAN (Controller Area Network) signal or the like fed from the vehicle.

Here, although the in-vehicle environmental state detector 30 in the embodiments 1-4 detects the located state of one of the talkers (passengers), voice acquisition units 1 and display units (output unit) 4 in the vehicle, the in-vehicle environmental state detector 30 in the present embodiment 5 detects one of the S/N ratio of the voice acquired by the voice acquisition unit 1, operating state of the audio system (audio equipment and the like) or air conditioning equipment (air conditioner and the like), the noise state in the vehicle and the opening/closing state of the window or roof of the vehicle.

Then, if the in-vehicle environmental state detector 30 detects the vehicle state that the environmental state in the vehicle is noisy, the present embodiment 5 alters the display format (display contents) in accordance with the vehicle state detected and displays.

Figure 16:
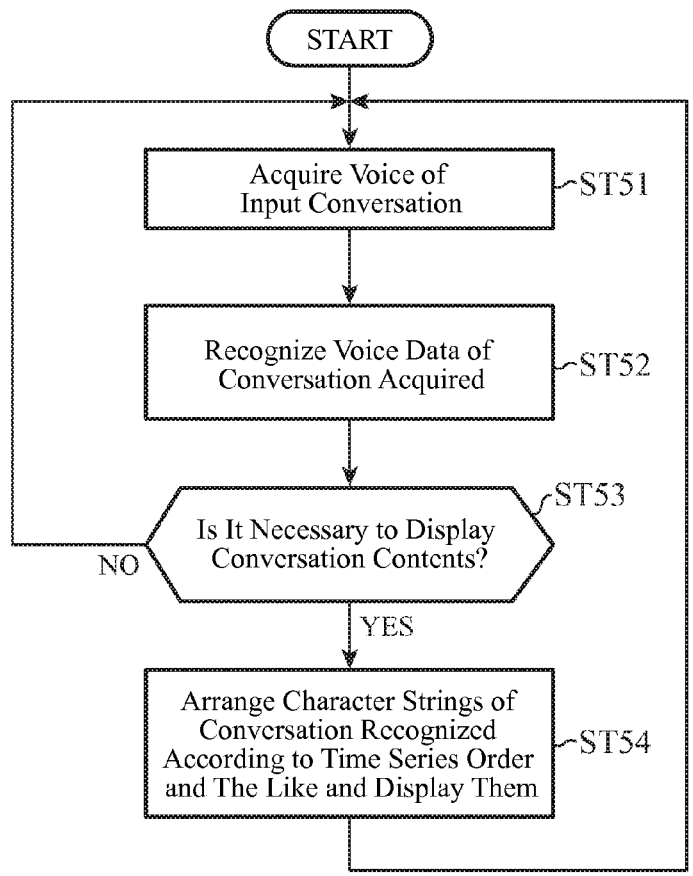
FIG. 16 is a flowchart showing the operation of the onboard information device of the embodiment 5.

Next, the operation of the onboard information device of the present embodiment 5 will be described. FIG. 16 is a flowchart showing the operation of the onboard information device of the embodiment 5.

First, if any speech input takes place, the voice acquisition unit 1 acquires the input voice, and carries out A/D conversion to obtain the voice data of a PCM format, for example (step ST51). Next, the voice recognition unit 2 recognizes the voice data obtained by the voice acquisition unit 1 (step ST52).

After that, the in-vehicle environmental state detector 30 decides on whether the display of the conversation contents is necessary or not depending on whether the environmental state in the vehicle is decided to be noisy or not (step ST53). More specifically, the in-vehicle environmental state detector 30 decides that the environmental state in the vehicle is noisy and that the presentation of the conversation is necessary if the voice S/N ratio acquired by the voice S/N acquisition unit 31 is less than the prescribed threshold, if the audio system operating state in the vehicle acquired by the audio system operating state acquisition unit 32 is in operation, if the air conditioner operating state in the vehicle acquired by the air conditioner operating state acquisition unit 33 is in operation, if the in-vehicle noise level acquired by the in-vehicle noise state acquisition unit 34 exceeds the prescribed threshold, or if the window or roof acquired by the opening/closing state acquisition unit 35 detects that the window or roof opening/closing state of the vehicle is open.

Then, if the in-vehicle environmental state detector 30 does not make a decision that the presentation of the conversation is necessary (NO at step ST53), it returns to step ST51 to execute the processing.

On the other hand, if it decides that the presentation of the conversation is necessary (YES at step ST53), the display controller 3 creates the display data by arranging the voice data recognized at step ST52 in a time-series order and delivers the display data to the display unit 4 so that the display unit 4 displays the conversation contents in character strings (step ST54).

As described above, according to the present embodiment 5, it continually catches the in-vehicle conversation and carries out the voice recognition, and if it makes a decision that the environmental state in the vehicle is noisy and it is very likely that the passenger may miss a word of the conversation, it exhibits the conversation contents. Accordingly, even if the conversation cannot be caught because of noise or the like, it can make it possible to confirm the conversation contents and make it easier to understand the flow of the conversation.

Embodiment 6

Figure 17:
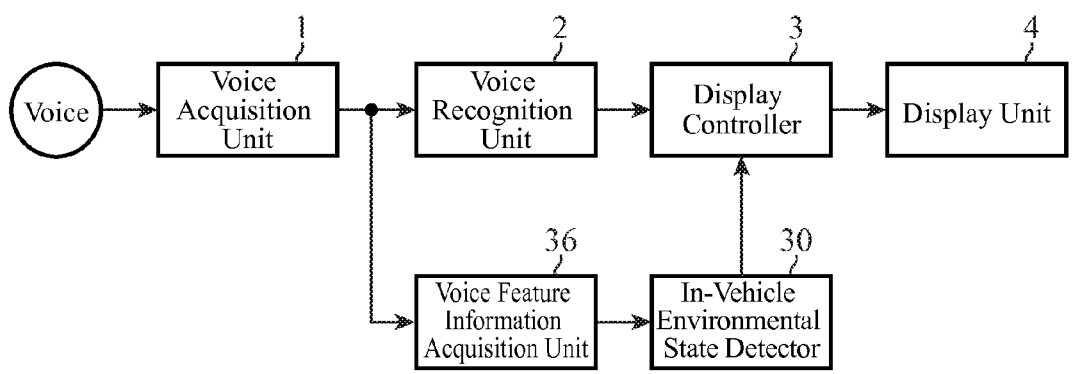
FIG. 17 is a block diagram showing a configuration of an onboard information device of an embodiment 6.

FIG. 17 is a block diagram showing a configuration of an onboard information device of an embodiment 6 in accordance with the present invention. Incidentally, the same components as those described in the embodiments 1-5 are designated by the same reference numerals and their duplicate description will be omitted. Compared with the basic configuration shown in FIG. 1 described in the embodiment 1, the embodiment 6 comprises an in-vehicle environmental state detector (vehicle state detector) 30, and a voice feature information acquisition unit 36.

In the present embodiment 6, the voice feature information acquisition unit 36 acquires the voice feature information including one of the type, volume, interval, sound quality, tone, color, tempo, and frequency characteristics of the voice the voice acquisition unit 1 acquires, and the in-vehicle environmental state detector 30 detects as the vehicle state the emotional state of a passenger who utters the voice according to the estimation based on the voice feature information. Then, when the in-vehicle environmental state detector 30 detects the vehicle state that estimates the emotional state of a passenger is cheerful/cheerless, the present embodiment 6 displays by altering the display format (display contents) according to the vehicle state detected.

Next, the operation of the onboard information device of the present embodiment 6 will be described. As for a flowchart showing the operation of the onboard information device of the present embodiment 6, since it is the same as the flowchart shown in FIG. 16 of the embodiment 5, a drawing thereof will be omitted. Only the decision processing at step ST53 differs from the embodiment 5.

First, if any speech input takes place, the voice acquisition unit 1 acquires the input voice, and carries out A/D conversion to obtain the voice data of a PCM format, for example (step ST51). Next, the voice recognition unit 2 recognizes the voice data obtained by the voice acquisition unit 1 (step ST52).

After that, the in-vehicle environmental state detector 30 decides on whether the display of the conversation contents is necessary or not depending on whether the emotional state of the passenger in the in-vehicle is cheerful or cheerless (step ST53). More specifically, the in-vehicle environmental state detector 30 estimates as to whether the emotional state of the passenger in the vehicle is cheerful or cheerless from the voice feature information acquired by the voice feature information acquisition unit 36, and if the emotional state of the passenger is cheerless, it decides that the conversation is likely to be difficult to catch, and that the presentation of the conversation is necessary.

Then, if it estimates that the emotional state of the passenger in the vehicle is cheerful, and decides that the presentation of the conversation is unnecessary (NO at step ST53), it returns to step ST51 to execute the processing.

On the other hand, if it estimates that the emotional state of the passenger in the vehicle is cheerless, and decides that the presentation of the conversation is necessary (YES at step ST53), the display controller 3 arranges the voice data recognized at step ST52 in a time-series order to create the display data, and delivers the display data to the display unit 4 so that the display unit 4 displays the conversation contents in the character strings (step ST54).

As described above, according to the present embodiment 6, it continually catches the in-vehicle conversation and carries out the voice recognition, and if the emotional state of the passenger in the vehicle is cheerless and if it decides that the conversation is likely to be difficult to catch, it displays the conversation contents. Accordingly, even if the conversation is difficult to catch because of noise or concentration on driving, it can make it possible to confirm the conversation contents and make it easier to understand the flow of the conversation.

Embodiment 7

Figure 18:
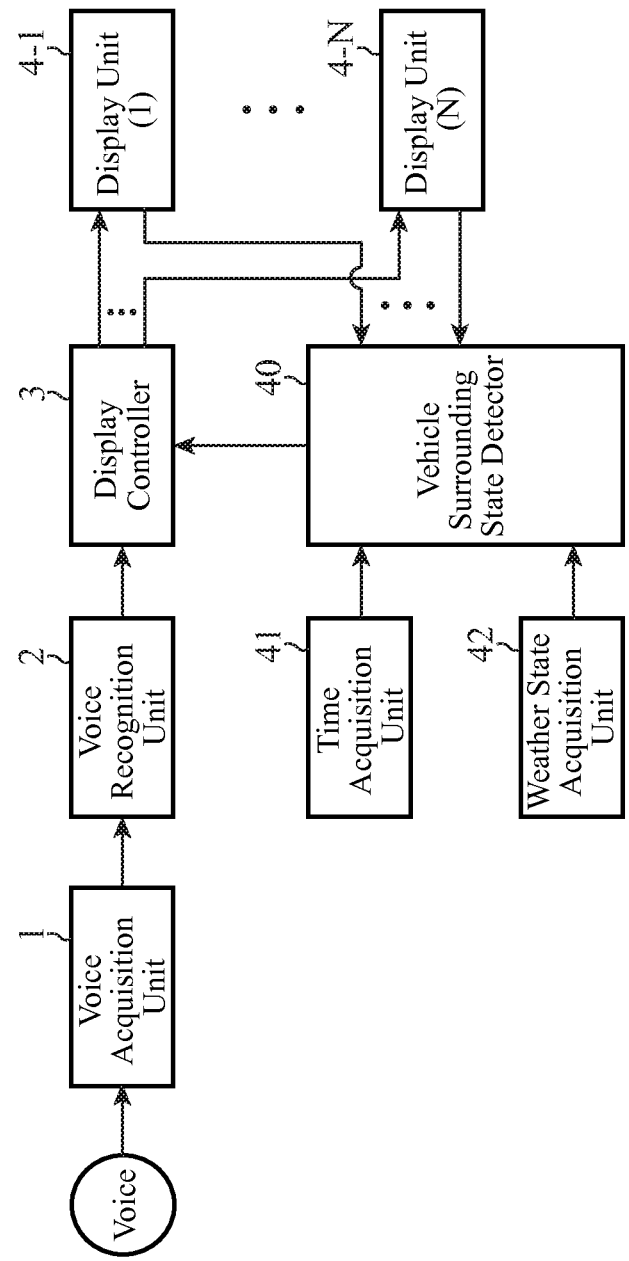
FIG. 18 is a block diagram showing a configuration of an onboard information device of an embodiment 7.

FIG. 18 is a block diagram showing a configuration of an onboard information device of an embodiment 7 in accordance with the present invention. Incidentally, the same components as those described in the embodiments 1-6 are designated by the same reference numerals and their duplicate description will be omitted. Compared with the block diagram shown in FIG. 10 described in the embodiment 4, the following embodiment 7 comprises a vehicle surrounding state detector (vehicle state detector) 40 instead of the in-vehicle environmental state detector (vehicle state detector) 30, and further comprises a time acquisition unit 41, and a weather state acquisition unit 42.

The vehicle surrounding state detector 40 of the present embodiment 7 detects as the vehicle state the surrounding state of the vehicle from one of the current date, time, a day of the week, and weather state around the vehicle acquired by the time acquisition unit 41 that acquires information such as the current date, time, a day of the week and the like, and by the weather state acquisition unit 42 that acquires weather information at the present vehicle position via a communication system.

Then, if the vehicle surrounding state detector 40 detects from the surrounding state of the vehicle that the driver must concentrate on the driving operation, the present embodiment 7 carries out control such as selection, alteration, switching or the like of the display unit that outputs the display data or the display unit that does not output it such as by displaying after altering the display format (display contents) or by changing a display mode of the display unit 4 at the driver's seat to a non-display mode according to the vehicle state detected.

Figure 19:
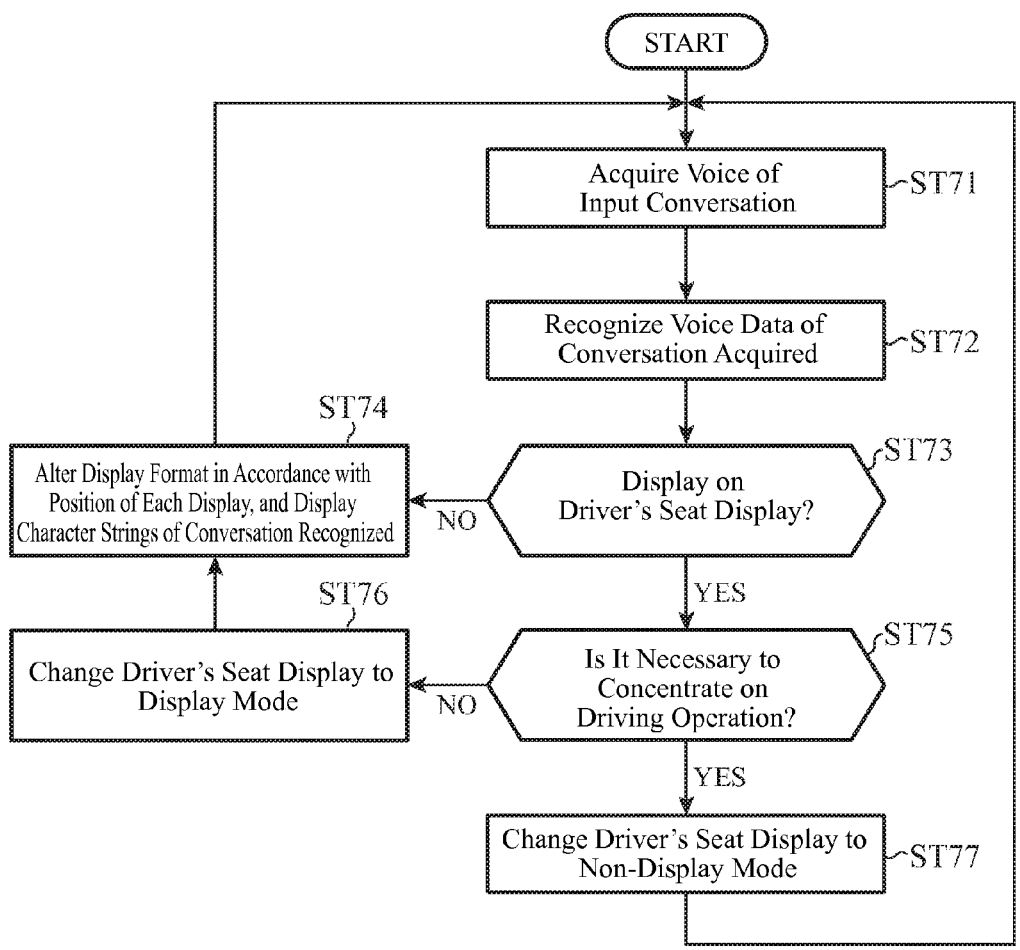
FIG. 19 is a flowchart showing the operation of the onboard information device of the embodiment 7.

Next, the operation of the onboard information device of the present embodiment 7 will be described. FIG. 19 is a flowchart showing the operation of the onboard information device of the embodiment 7.

First, if any speech input takes place, the voice acquisition unit 1 acquires the input voice, and carries out A/D conversion to obtain the voice data of a PCM format, for example (step ST71). Next, the voice recognition unit 2 recognizes the voice data obtained by the voice acquisition unit 1 (step ST72).

Then, unless the display controller 3 carries out display on the display unit 4 at the driver's seat (position visible from the driver) (NO at step ST73), the display controller 3 creates the display data by arranging the character strings of the voice recognition result from the voice recognition unit 2 at step ST72 in a time-series order and by altering the display format (display contents) in accordance with the position of each display unit 4 (4-1, 4-2, . . . , 4-N), and delivers the display data to the individual display units 4. Thus, each display unit 4 displays the conversation contents in the character strings (step ST74).

On the other hand, if the display controller 3 carries out display on the display unit 4 at the driver's seat (position visible from the driver) (YES at step ST73), the vehicle surrounding state detector 40 decides at step 75 on whether the driver must concentrate on the driving operation or not from one of the date, time, a day of the week, and weather around the current position of the vehicle (step ST75). More specifically, according to the date, time, a day of the week around the current position of the vehicle acquired by the time acquisition unit 41 and according to the weather around the current position of the vehicle acquired by the weather state acquisition unit 42, the vehicle surrounding state detector 40 decides that the driver must concentrate on the driving operation if the date or the day of the week is a period of congestion, if the time period is night, or if it is rainy.

Then, if the vehicle surrounding state detector 40 does not decide that the concentration on driving is necessary (NO at step ST75), the display controller 3 sets the display unit 4 at the driver's seat in the display mode (step ST76). However, it does nothing if the display unit has already been set in the display mode.

On the other hand, if it decides that the concentration on driving is necessary (YES at step ST75), the display controller 3 sets the display unit 4 at the driver's seat in the non-display mode (step ST77). However, it does nothing if the display unit has already been set in the non-display mode.

As described above, according to the present embodiment 7, it continually catches the conversation in the vehicle and carries out the voice recognition, and if the position of the display unit and the surrounding state of the vehicle are in the state in which the driver must concentrate on the driving operation, it prevents the display unit at the driver's seat from displaying the voice recognition result. Accordingly, in addition to the advantages of the embodiment 4, it can prevent the driver from looking aside while driving.

Embodiment 8

Figure 20:
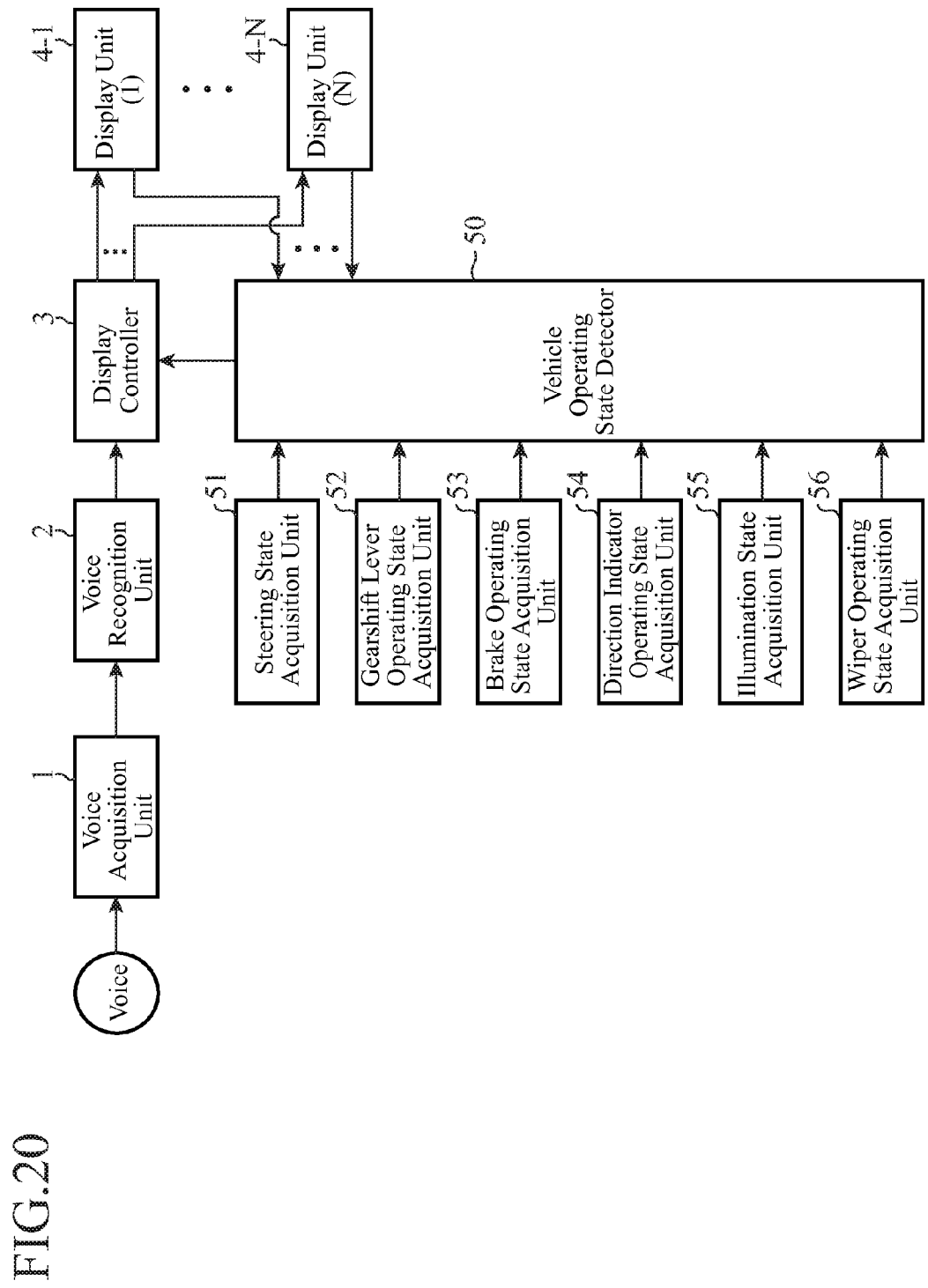
FIG. 20 is a block diagram showing a configuration of an onboard information device of an embodiment 8.

FIG. 20 is a block diagram showing a configuration of an onboard information device of an embodiment 8 in accordance with the present invention. Incidentally, the same components as those described in the embodiments 1-7 are designated by the same reference numerals and their duplicate description will be omitted. Compared with the block diagram shown in FIG. 10 described in the embodiment 4, the following embodiment 8 comprises a vehicle operating state detector (vehicle state detector) 50 instead of the in-vehicle environmental state detector (vehicle state detector) 30, and further comprises a steering state acquisition unit 51, gearshift lever operating state acquisition unit 52, brake operating state acquisition unit 53, direction indicator operating state acquisition unit 54, illumination state acquisition unit 55, and a wiper operating state acquisition unit 56.

The steering state acquisition unit 51, gearshift lever operating state acquisition unit 52, brake operating state acquisition unit 53, direction indicator operating state acquisition unit 54, illumination state acquisition unit 55, and wiper operating state acquisition unit 56 acquire used/unused signals of the steering, gearshift lever, brake, direction indicator, illumination, and wipers from the CAN signal or the like from the vehicle, respectively.

The vehicle operating state detector 50 in the present embodiment 8 is for detecting the operating state of the components such as the steering, gearshift lever, brake, direction indicator, illumination, and wipers of the vehicle. Then, if the vehicle operating state detector 50 detects that the foregoing vehicle facilities are in a used state, the present embodiment 8 carries out control such as selection, alteration, switching or the like of the display unit that outputs or does not output the display data such as by displaying after altering the display format (display contents) or by changing the display mode of the display unit 4 at the driver's seat to a non-display mode according to the vehicle state detected.

Next, the operation of the onboard information device of the present embodiment 8 will be described. As for a flowchart showing the operation of the onboard information device of the present embodiment 8, since it is the same as the flowchart shown in FIG. 19 of the embodiment 7, a drawing thereof will be omitted. Only the decision processing at step ST75 differs from the embodiment 7.

First, if any speech input takes place, the voice acquisition unit 1 acquires the input voice, and carries out A/D conversion to obtain the voice data of a PCM format, for example (step ST71). Next, the voice recognition unit 2 recognizes the voice data obtained by the voice acquisition unit 1 (step ST72).

Then, unless the display controller 3 carries out display on the display unit 4 at the driver's seat (position visible from the driver) (NO at step ST73), the display controller 3 creates the display data by arranging the character strings of the voice recognition result from the voice recognition unit 2 in a time-series order and by altering the display format (display contents) in accordance with the position of each display unit 4 (4-1, 4-2, . . . , 4-N), and delivers the display data to the individual display units 4. Thus, each display unit 4 displays the conversation contents in the character strings (step ST74).

On the other hand, if the display controller 3 carries out display on the display unit 4 at the driver's seat (position visible from the driver) (YES at step ST73), the vehicle operating state detector 50 decides at step 75 on whether the driver must concentrate on the driving operation or not from whether the steering, gearshift lever, brake, direction indicator, illumination, or wipers of the vehicle are being used or not (step ST75). More specifically, when the used/unused signals are being used (during use) of the steering state, gearshift lever, brake, direction indicator, illumination, and wipers of the vehicle acquired by the steering state acquisition unit 51, gearshift lever operating state acquisition unit 52, brake operating state acquisition unit 53, direction indicator operating state acquisition unit 54, illumination state acquisition unit 55, and wiper operating state acquisition unit 56, the vehicle operating state detector 50 decides that the driver must concentrate on the driving operation.

Then, if the vehicle operating state detector 50 does not decide that the concentration on the driving operation is necessary (NO at step ST75), the display controller 3 sets the display unit 4 at the driver's seat in the display mode (step ST76). However, it does nothing if the display unit has already been set in the display mode.

On the other hand, if it decides that the concentration on the driving operation is necessary (YES at step ST75), the display controller 3 sets the display unit 4 at the driver's seat in the non-display mode (step ST77). However, it does nothing if the display unit has already been set in the non-display mode.

As described above, according to the present embodiment 8, it continually catches the conversation in the vehicle and carries out the voice recognition, and prevents the display unit at the driver's seat from displaying the voice recognition result if the driver must concentrate on the driving operation judging from the position of the display unit and from the operation state of the vehicle that one of the steering state, gearshift lever, brake, direction indicator, illumination, and wipers of the vehicle is in use. Accordingly, in addition to the advantages of the embodiment 4, it can prevent the driver from looking aside while driving.

Embodiment 9

Figure 21:
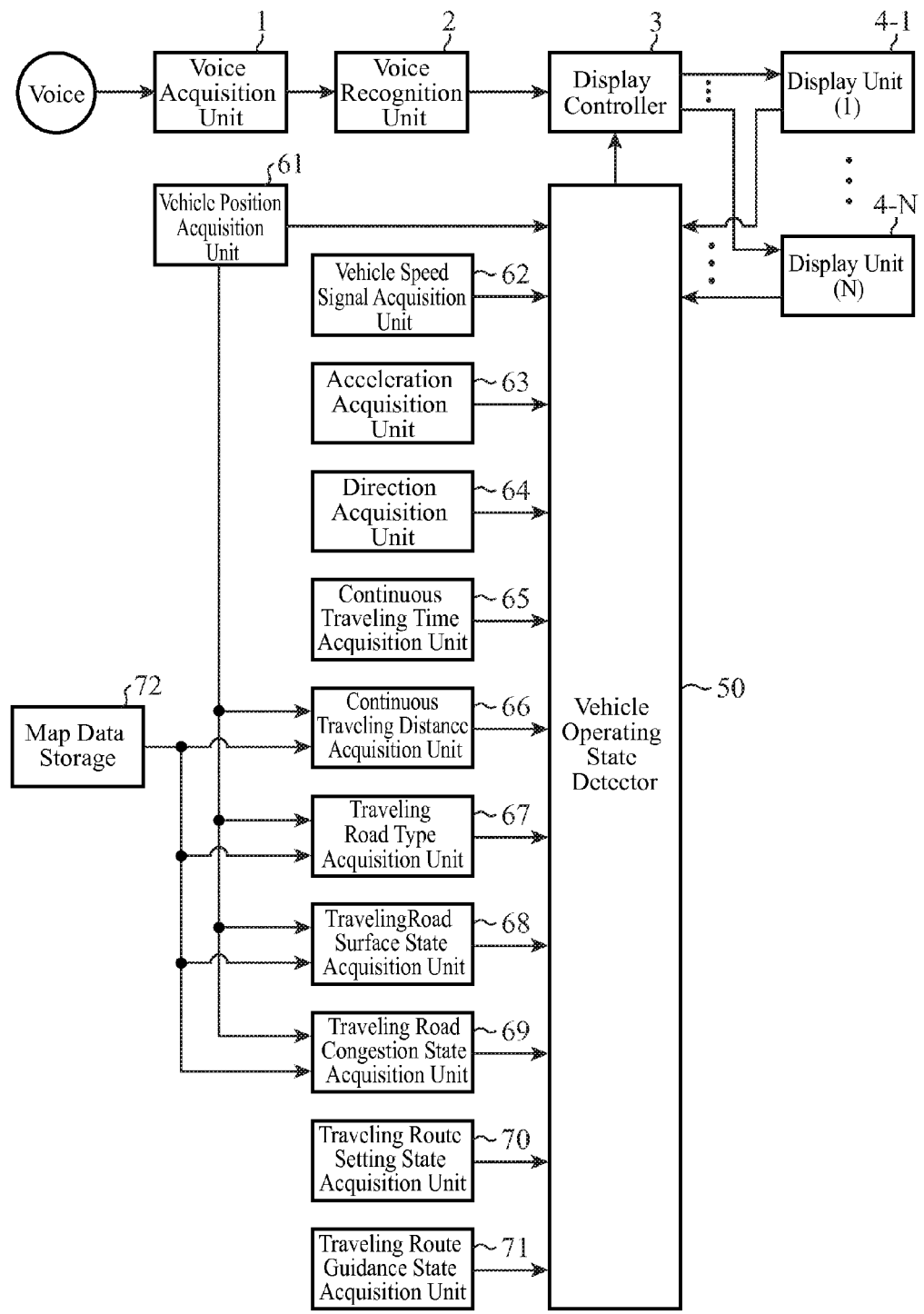
FIG. 21 is a block diagram showing a configuration of an onboard information device of an embodiment 9.

FIG. 21 is a block diagram showing a configuration of an onboard information device of an embodiment 9 in accordance with the present invention. Incidentally, the same components as those described in the embodiments 1-8 are designated by the same reference numerals and their duplicate description will be omitted. Compared with the block diagram shown in FIG. 10 described in the embodiment 4, the following embodiment 9 comprises a vehicle operating state detector (vehicle state detector) 50 instead of the in-vehicle environmental state detector (vehicle state detector) 30, and further comprises a vehicle position acquisition unit 61, a vehicle speed signal acquisition unit 62, an acceleration acquisition unit 63, a direction acquisition unit 64, a continuous traveling time acquisition unit 65, a continuous traveling distance acquisition unit 66, a traveling road type acquisition unit 67, a traveling road surface state acquisition unit 68, a traveling road congestion state acquisition unit 69, a traveling route setting state acquisition unit 70, and a traveling route guidance state acquisition unit 71.

The vehicle operating state detector 50 of the present embodiment 9 detects the operating state of the vehicle of one of the present position, speed, acceleration, direction, continuous traveling distance, continuous traveling time, traveling road type, traveling road surface state, traveling road congestion state, traveling route setting state, traveling route guidance state of the vehicle.

Then, the present embodiment 9 alters the display format (display contents) according to the vehicle state detected by the vehicle operating state detector 50, and carries out display.

Incidentally, when a plurality of display units 4 are provided as in the embodiments 4, 7 and 8, it is also possible to carry out control of display by altering the display format (display contents) according to the vehicle state detected by the vehicle operating state detector 50, or control of selecting, altering, switching or the like of the display unit that outputs or does not output the display data such as setting the display unit 4 at the driver's seat in the non-display mode during the operation of the vehicle.

The vehicle position acquisition unit 61 acquires the present position of the vehicle using information acquired from a GPS (Global Positioning System) receiver or a gyroscope or the like.

The vehicle speed signal acquisition unit 62 acquires the speed information of the vehicle from the CAN signal or the like of the vehicle.

The acceleration signal acquisition unit 63 acquires the acceleration of the vehicle from the gyroscope or from the operation of the accelerator, brake and steering wheel of the vehicle.

The direction acquisition unit 64 acquires the direction of the vehicle from the moving direction of the vehicle position or from an electronic compass.

The continuous traveling time acquisition unit 65 and the continuous traveling distance acquisition unit 66 acquire the continuous traveling time and continuous traveling distance, respectively, from a car navigation or the CAN signal or the like from the vehicle.

The traveling road type acquisition unit 67 and the traveling road surface state acquisition unit 68 acquire the type and the surface state of the road on which the vehicle is now running from the present position information about the vehicle acquired by the vehicle position acquisition unit 61 and from the map data stored in a map data storage 72 or the like which will be described later. As acquirable information, there are road states that will affect the noise conditions or driving operation such as "in a tunnel or not" and "paved or not paved". In addition, a configuration is also possible which acquires such information as "going into a tunnel soon" when the vehicle position is not yet in the tunnel, but will go into the tunnel as the vehicle moves along the road.

The traveling road congestion state acquisition unit 69 acquires the congestion information on the vehicle position through communication equipment, or acquires VICS (Vehicle Information and Communication System: registered trademark) information (traffic information) by radio wave or infrared beacon.

The traveling route setting state acquisition unit 70 and the traveling route guidance state acquisition unit 71 acquire information about the current traveling route setting state and traveling route guidance state from the navigation system.

The map data storage 72 stores map data such as road data and tunnel data. The map data storage 72 can be any type like a DVD-ROM, a hard disk and an SD card. In addition, a configuration is also possible which is placed on a network and can acquire information such as road data via a communication network.

The vehicle operating state detector 50 decides on whether the vehicle is running or stopping from the information acquired from the vehicle position acquisition unit 61, vehicle speed signal acquisition unit 62, acceleration acquisition unit 63, direction acquisition unit 64, continuous traveling time acquisition unit 65, and continuous traveling distance acquisition unit 66; decides on whether the road state will affect the driving operation or noise conditions of the road on which the vehicle is running from the information acquired from the traveling road type acquisition unit 67, traveling road surface state acquisition unit 68, and traveling road congestion state acquisition unit 69; and decides on whether the traveling route is set and guided by the navigation system or not.

Then, the display controller 3 sets the display unit 4 at the driver's seat (visible from the driver) in the non-display mode of the display contents if the vehicle operating state detector 50 decides that the vehicle is running or the road is in the state of affecting the driving operation.

Next, the operation of the onboard information device of the present embodiment 9 will be described. As for a flowchart showing the operation of the onboard information device of the present embodiment 9, since it is the same as the flowchart shown in FIG. 19 of the embodiment 7, a drawing thereof will be omitted. Only the decision processing at step ST75 differs from the embodiment 7.

First, if any speech input takes place, the voice acquisition unit 1 acquires the input voice, and carries out A/D conversion to obtain the voice data of a PCM format, for example (step ST71). Next, the voice recognition unit 2 recognizes the voice data obtained by the voice acquisition unit 1 (step ST72). Then, if the display controller 3 does not carry out display on the display unit 4 at the driver's seat (position visible from the driver) (NO at step ST73), the display controller 3 creates the display data by arranging the character strings of the voice recognition result from the voice recognition unit 2 in a time-series order and by altering the display format (display contents) in accordance with the position of each display unit 4 (4-1, 4-2, . . . , 4-N), and delivers the display data to the individual display units 4. Thus, each display unit 4 displays the conversation contents in the character strings (step ST74).

On the other hand, if the display controller 3 carries out display on the display unit 4 at the driver's seat (position visible from the driver) (YES at step ST73), the vehicle operating state detector 50 decides at step 75 whether the vehicle is running or stopping from one of the present position of the vehicle, vehicle speed, acceleration, direction, continuous traveling time, and continuous traveling distance; decides on whether the road state will affect the driving operation or the noise conditions of the road on which the vehicle is running from one of the type, surface state and congestion state of the road on which the vehicle is running; or decides on whether the driver must concentrate on the driving operation now by making a decision on whether the navigation of the traveling route is being performed (whether the traveling route is set and guided by the navigation system) from the traveling route setting state or traveling route guidance state (step ST75).

Then, if the vehicle operating state detector 50 does not decide that the concentration on the driving operation is necessary (NO at step ST75), the display controller 3 sets the display unit 4 at the driver's seat in the display mode (step ST76). However, it does nothing if the display unit has already been set in the display mode.

On the other hand, if it decides that the concentration on the driving operation is necessary (YES at step ST75), the display controller 3 sets the display unit 4 at the driver's seat in the non-display mode (step ST77). However, it does nothing if the display unit has already been set in the non-display mode.

As described above, according to the present embodiment 9, it continually catches the conversation in the vehicle and carries out the voice recognition, and if the position of the display unit and the operation state of the vehicle indicate the state that the driver must concentrate on the driving operation, it prevents the display unit at the driver's seat from displaying the voice recognition result. Accordingly, in addition to the advantages of the embodiment 4, it can prevent the driver from looking aside while driving.

Embodiment 10

Figure 22:
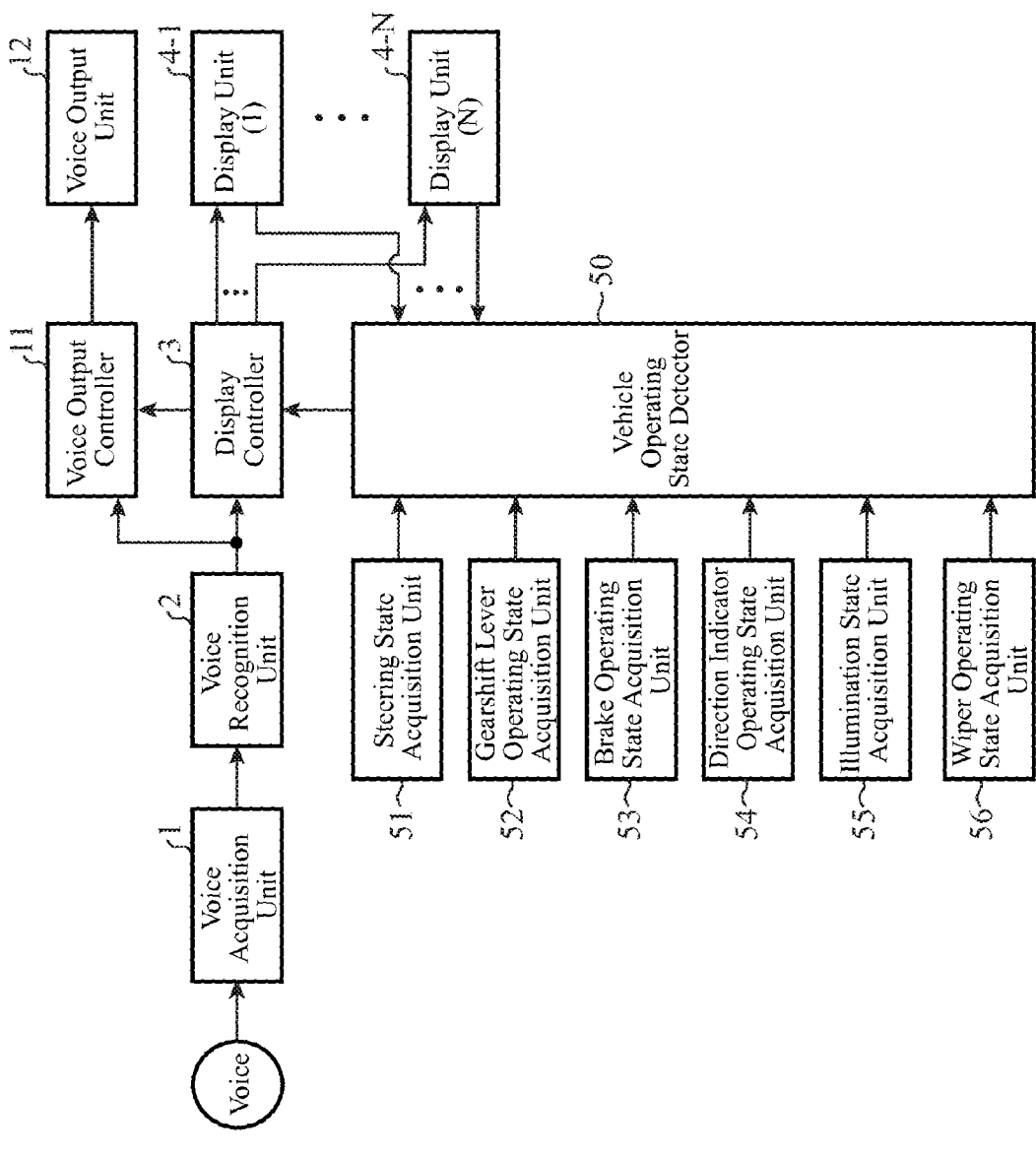
FIG. 22 is a block diagram showing a configuration of an onboard information device of an embodiment 10.

FIG. 22 is a block diagram showing a configuration of an onboard information device of an embodiment 10 in accordance with the present invention. Incidentally, the same components as those described in the embodiments 1-9 are designated by the same reference numerals and their duplicate description will be omitted. Compared with the block diagram shown in FIG. 20 described in the embodiment 8, the following embodiment 10 further comprises a voice output controller 11 and a voice output unit 12. Since it disables the display unit 4 at the driver's seat to display during driving, it provides the driver with conversation contents through voice output as alternative information. Incidentally, although the present embodiment 10 will be described here on the basis of the embodiment 7, the embodiment 8 or 9 can have a like configuration that comprises the voice output controller and voice output unit.

When the display unit 4 at the driver's seat is placed in the non-display mode, the voice output controller 11 carries out speech synthesis of the speech contents recognized by the voice recognition unit 2 and delivers to the voice output unit 12.

Incidentally, although the present embodiment 10 has a configuration that outputs the synthesized speech, a configuration is also possible which outputs the voice-active section detected by the voice recognition unit 2 instead of the synthesized speech.

The voice output unit 12 outputs the voice data delivered from the voice output controller 11 through a speaker or the like.

Figure 23:
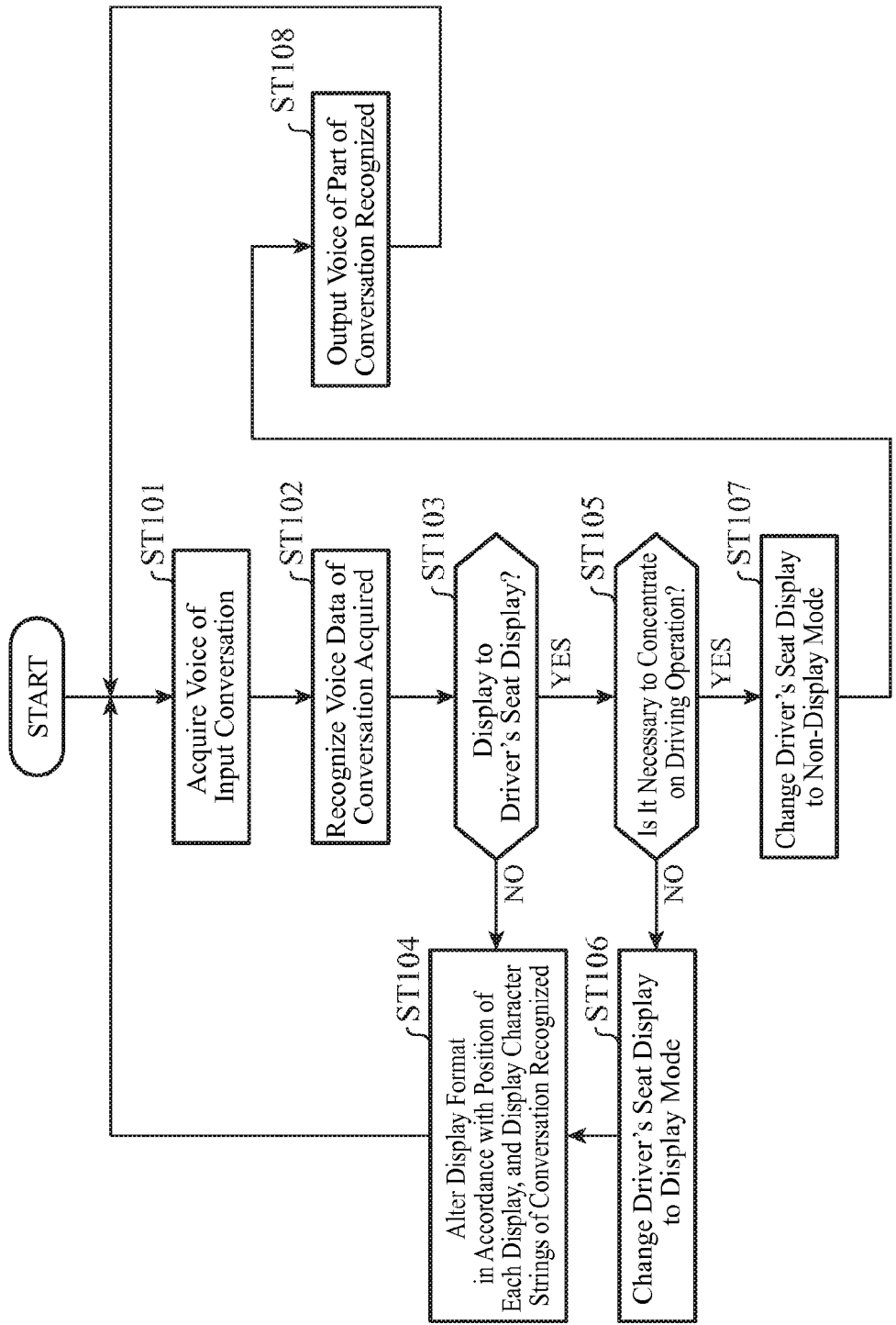
FIG. 23 is a flowchart showing the operation of the onboard information device of the embodiment 10.

Next, the operation of the onboard information device of the present embodiment 10 will be described. FIG. 23 is a flowchart showing the operation of the onboard information device of the embodiment 10.

As for the processing from step ST101 to step ST107, since it is the same as the processing from step ST71 to step ST77 of the flowchart of FIG. 19 in the embodiment 7, the description thereof will be omitted. Then, in the present embodiment 10, after the display unit 4 at the driver's seat is placed in the non-display mode at step ST107, the voice output controller 11 delivers the voice data of the speech contents recognized by voice recognition unit 2 to the voice output unit 12 to output the voice data (step ST108).

In this way, the present embodiment 10 sets the display unit at the driver's seat in the non-display mode during driving as in the embodiment 7, and provides the driver with the conversation contents through the voice output as alternative information. Accordingly, the driver can recognize the conversation contents by voice.

As described above, according to the present embodiment 10, it outputs the voice recognition result through the voice output unit when the display unit at the driver's seat is maintained in the non-display mode during driving. Accordingly, in addition to the advantages of the embodiment 7, the present embodiment 10 enables the driver to recognize the conversation contents by voice even during driving.

Embodiment 11

Figure 24:
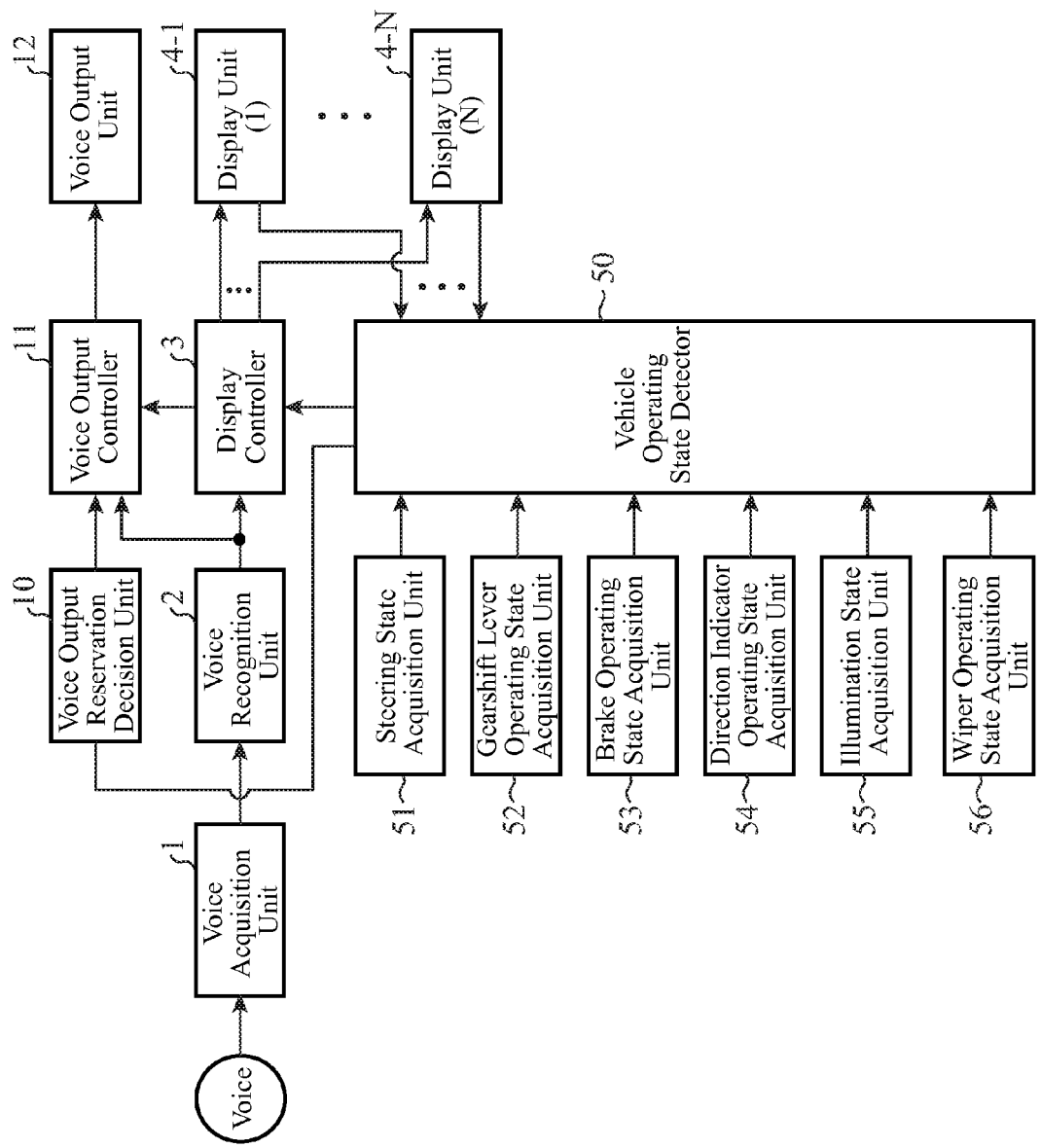
FIG. 24 is a block diagram showing a configuration of an onboard information device of an embodiment 11.

FIG. 24 is a block diagram showing a configuration of an onboard information device of an embodiment 11 in accordance with the present invention. Incidentally, the same components as those described in the embodiments 1-10 are designated by the same reference numerals and their duplicate description will be omitted. Compared with the block diagram shown in FIG. 20 described in the embodiment 8, the following embodiment 11 further comprises a voice output reservation decision unit 10, a voice output controller 11 and a voice output unit 12. Since it disables the display unit 4 at the driver's seat to display during driving, it provides the driver with conversation contents through voice output as alternative information. Incidentally, although the present embodiment 11 will be described here on the basis of the embodiment 8, the embodiment 9 can have a like configuration that comprises the voice output reservation decision unit, voice output controller and voice output unit.

Compared with the embodiment 10, the present embodiment 11 differs only in that it comprises the voice output reservation decision unit 10.

The voice output reservation decision unit 10 decides on whether the current situation is that which requires particular caution such as making a right or left turn or a lane change according to the information from the steering state acquisition unit 51, gearshift lever operating state acquisition unit 52, brake operating state acquisition unit 53, direction indicator operating state acquisition unit 54, illumination state acquisition unit 55, and wiper operating state acquisition unit 56, decides the necessity for the reservation of the voice output and notifies the voice output controller 11 of it.

When the display unit 4 at the driver's seat is placed in the non-display mode, the voice output controller 11 carries out speech synthesis of the speech contents recognized by the voice recognition unit 2 and delivers to the voice output unit 12. However, if the voice output reservation decision unit 10 notifies it of the reservation of the voice output, it stops the output without delay. If the reservation removed, it delivers the voice data reserved from its top again. In addition, when the reservation time is long, it can discard the voice data reserved.

Incidentally, although the present embodiment 11 has a configuration that outputs the synthesized speech, a configuration is also possible which outputs the voice-active section detected by the voice recognition unit 2 instead of the synthesized speech.

The voice output unit 12 outputs the voice data delivered from the voice output controller 11 through a speaker or the like.

Figure 25:
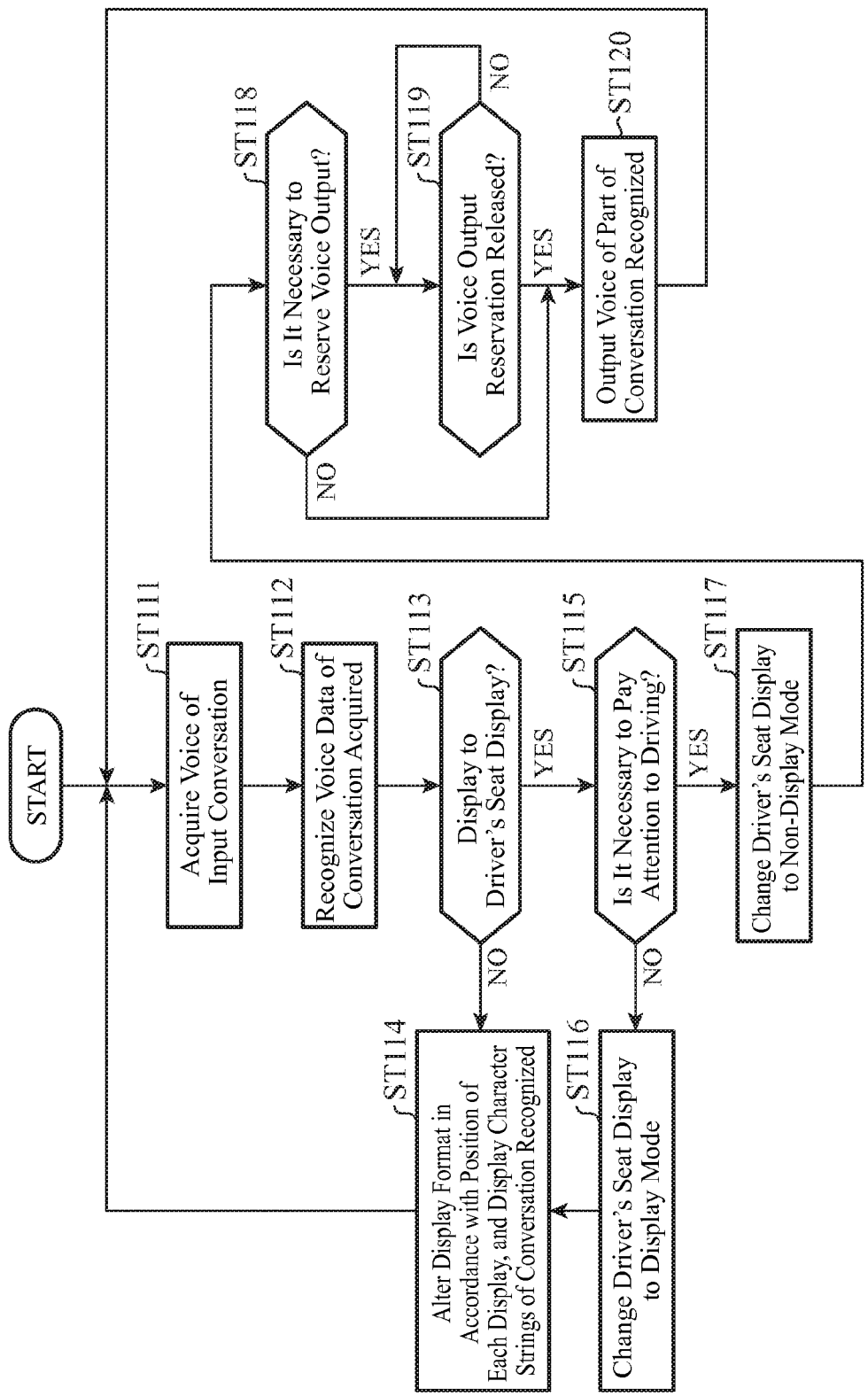
FIG. 25 is a flowchart showing the operation of the onboard information device of the embodiment 11.

Next, the operation of the onboard information device of the present embodiment 11 will be described. FIG. 25 is a flowchart showing the operation of the onboard information device of the embodiment 11.

As for the processing from step ST111 to step ST117, since it is the same as the processing from step ST101 to step ST107 of the flowchart of FIG. 23 in the embodiment 10, the description thereof will be omitted. Then, in the present embodiment 11, after the display unit 4 at the driver's seat is placed in the non-display mode at step ST117, the voice output reservation decision unit 10 decides on the necessity for the reservation of the voice output (step ST118). If a decision is made that the reservation of the voice output is necessary (YES at step ST118), it reserves the voice data to be delivered to the voice output unit 12 until the reservation of the voice output is removed (NO at step ST119).

If a decision is made at step ST118 that the reservation of the voice output is unnecessary (NO at step ST118) or the reservation of the voice output is removed (YES at step ST119), the voice output controller 11 delivers the voice data of the speech contents recognized by the voice recognition unit 2 to the voice output unit 12 to output the voice data (step ST120). Incidentally, if the reservation is made during the voice output and then removed, it outputs the voice data reserved from its beginning again.

Here, the processing of the voice output reservation decision unit 10 that makes a decision on the necessity for the reservation of the voice output at step ST118 will be described. For example, when the direction indicator operating state acquisition unit 54 detects that the direction indicator is used and when the vehicle operating state detector 50 detects that the operating state of the vehicle is that of making a right or left turn or a lane change, the voice output reservation decision unit 10 decides that the situation is that which requires particular caution in driving because of the right or left turn or the lane change, decides that the reservation of the voice output is necessary, and notifies the voice output controller 11 that "the reservation of the voice output is required". On the contrary, if the voice output reservation decision unit 10 decides that the reservation of the voice output is unnecessary because it is detected from the information delivered from the steering state acquisition unit 51, gearshift lever operating state acquisition unit 52, brake operating state acquisition unit 53, direction indicator operating state acquisition unit 54, illumination state acquisition unit 55, and wiper operating state acquisition unit 56 that none of them are used, it notifies the voice output controller 11 that "the reservation of the voice output is unnecessary".

In this way, the present embodiment 11 sets the display unit at the driver's seat in the non-display mode during driving as in the embodiment 10, and provides the driver with the conversation contents through the voice output as alternative information. Accordingly, the driver can recognize the conversation contents by voice. In addition, it detects as to whether the situation requires a particular caution in driving such as making a right or left turn or a lane change, and if it decides that the situation requires a particular caution in driving, it stops (reserves) even the voice output, thereby enabling the driver to concentrate on driving.

As described above, according to the present embodiment 11, it outputs the voice recognition result through the voice output unit while the display unit at the driver's seat is maintained in the non-display mode during driving. Accordingly, in addition to the advantages of the embodiment 10, the present embodiment 11 enables the driver to recognize the conversation contents by voice even during driving. In addition, since it stops providing the voice in the situation that requires a particular caution such as a right or left turn or a lane change, the driver can further concentrate on driving.

Embodiment 12

Figure 26:
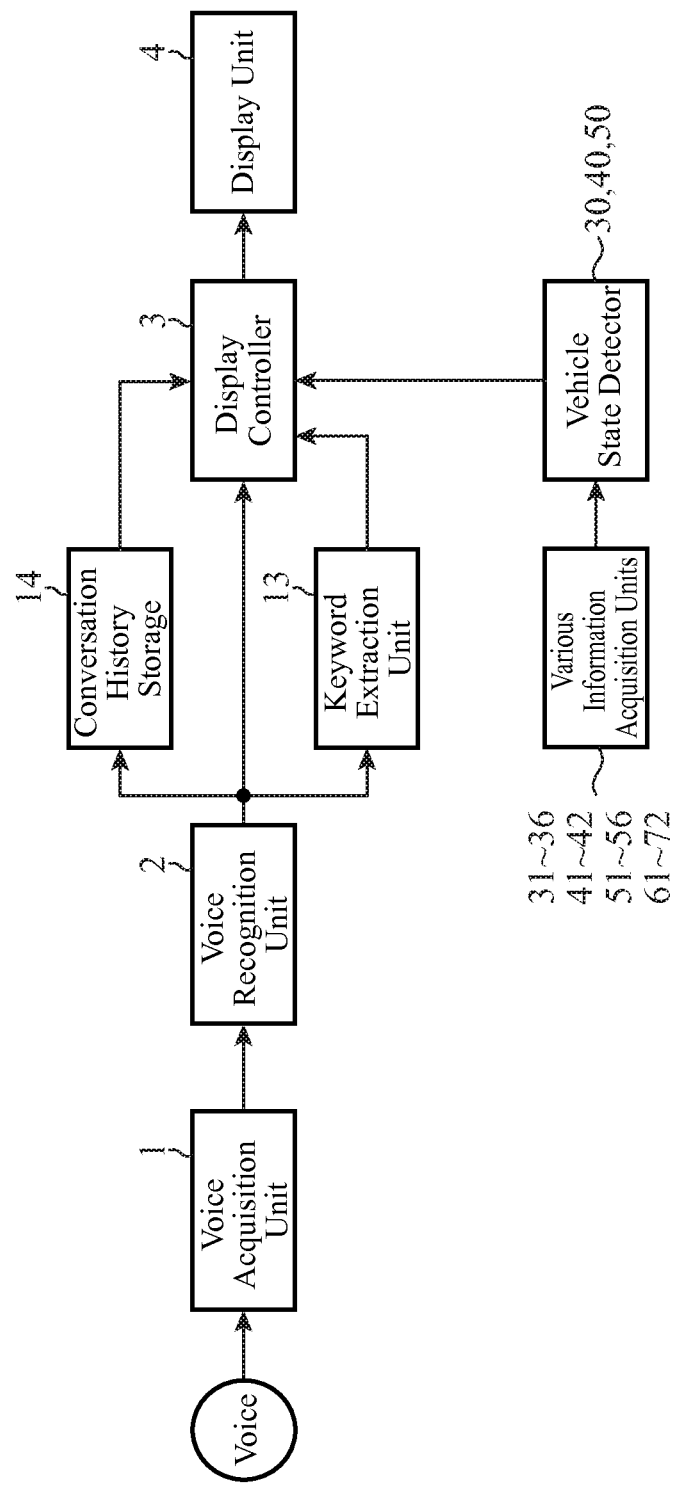
FIG. 26 is a block diagram showing a configuration of an onboard information device of an embodiment 12.

FIG. 26 is a block diagram showing a configuration of an onboard information device of an embodiment 12 in accordance with the present invention. Incidentally, the same components as those described in the embodiments 1-11 are designated by the same reference numerals and their duplicate description will be omitted. Compared with the basic configuration shown in FIG. 1 described in the embodiment 1, the embodiment 12 comprises one of the sets of the acquisition units 31-36, 41-42, 51-56 and 61-72 described in the embodiments 5-10, and the vehicle state detector 30, 40 or 50, and further comprises a keyword extraction unit 13 and a conversation history storage 14. The present embodiment 12 decides the necessity for outputting all or part of the speech contents from the vehicle state detected by the vehicle state detector 30, 40 or 50 or from a prescribed keyword extracted by the keyword extraction unit 13. It generates the display data of all or part of the speech contents on which a decision is made that the output is necessary, or decides the timing of a display start or display stop, or alters the timing of display.

The keyword extraction unit 13 extracts the keyword, if a conversation character string recognized by the voice recognition unit 2 contains a prescribed keyword such as "what?", "display the conversation in subtitles", "do not display the conversation in subtitles" or "the subtitles are obstructive".

The conversation history storage 14 is for storing all the speech contents recognized by the voice recognition unit 2. If the instruction from the display controller 3 requires the conversation just before, the conversation history storage 14 delivers the conversation just before the conversation contents stored.

The display controller 3 delivers the speech contents recognized by the voice recognition unit 2 to the display unit 4 as presentation contents according to the information acquired from the set of the acquisition units 31-36, 41-42, 51-56, or 61-72. For example, by combining the following decisions, the display controller 3 carries out control such as switching display or non-display of the conversation contents, displaying the conversation to be presented from just before it when it is displayed, or on the contrary presents just after the conversation. Incidentally, when presenting the conversation from just before it, the display controller 3 acquires the conversation just before from the conversation history storage 14 and displays. In addition, the following decisions a)-h) are only an example, and it goes without saying that a combination of other conditions can be used in accordance with the information acquired from the set of the acquisition units 31-36, 41-42, 51-56, or 61-72.

a) If the vehicle speed is not less than a prescribed threshold, the presentation is made, but if it is less than the threshold, the presentation is not made.

b) If a window is opened, the presentation is made, but if it is closed, the presentation is not made.

c) If the vehicle is running in a tunnel, the presentation is made, but if it is outside the tunnel, the presentation is not made.

d) If it is notified that the vehicle goes into a tunnel soon, the presentation is started from the conversation just after that.

e) If the input voice S/N ratio is not greater than the threshold, the presentation is made, but if it is greater than the threshold, the presentation is made.

f) If the voice recognition result contains a keyword such as "what?" which indicates that the conversation cannot be caught, the presentation is made from the conversation just before the keyword.

g) If the voice recognition result contains a keyword such as "display the conversation in subtitles" which indicates an instruction to display, the presentation is made from the conversation just after the keyword.

h) If the voice recognition result contains a keyword such as "do not display the conversation in subtitles", "the subtitles are obstructive" or the like which indicates an instruction not to display, the presentation of the conversation is not made.

Figure 27:
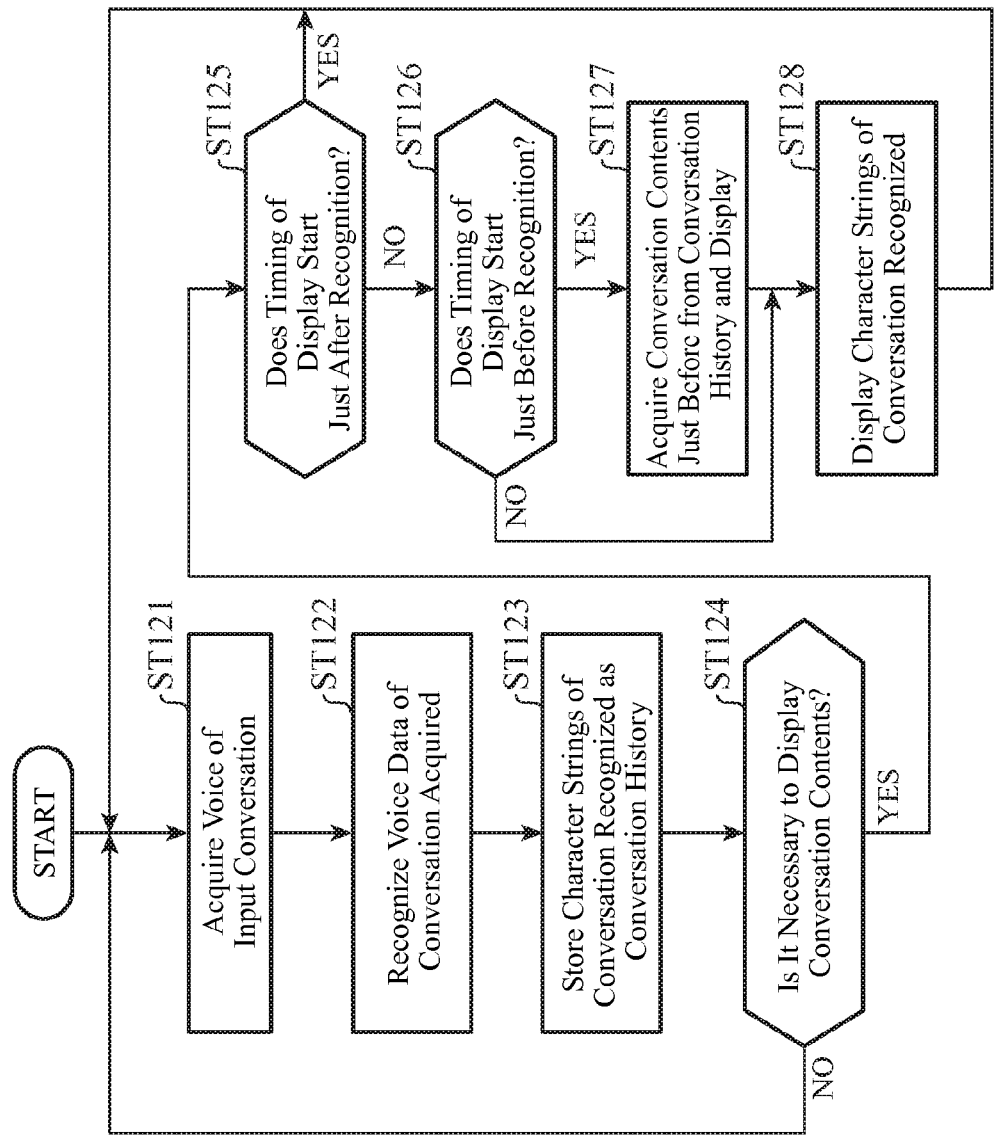
FIG. 27 is a flowchart showing the operation of the onboard information device of the embodiment 12.

Next, the operation of the onboard information device of the present embodiment 12 will be described. FIG. 27 is a flowchart showing the basic operation of the onboard information device of the embodiment 12.

First, if any speech input takes place, the voice acquisition unit 1 acquires the input voice, and carries out A/D conversion to obtain the voice data of a PCM format, for example (step ST121). Next, the voice recognition unit 2 recognizes the voice data obtained by the voice acquisition unit 1 (step ST122). Then, the voice recognition unit 2 stores the character string of the conversation it recognizes in the conversation history storage 14 as the conversation history so that the display controller 3 can refer to the speech contents recognized afterward (step ST123).

After that, the display controller 3 decides on whether the display of the conversation contents is necessary or not from the combinations of the foregoing decisions a)-h) (step ST124). If the display controller 3 decides that the presentation of the conversation is necessary (YES at step ST124), and if it is informed that the timing of the presentation is just after the recognition (YES at step ST125), it returns to step ST121 to execute the processing.

Incidentally, if it decides that the presentation of the conversation is unnecessary (NO at step ST124), it also returns to step ST121.

On the other hand, if the display controller 3 decides that the presentation of the conversation is necessary, and if it is informed that the timing of the presentation is just before the recognition (YES at step ST126), the display controller 3 acquires the conversation contents just before from the conversation history stored in the conversation history storage 14 to create the display data, and delivers it to the display unit 4 (step ST127), followed by delivering the display data generated from the character strings of the speech (current speech contents) recognized by the voice recognition unit 2 to the display unit 4 to display (step ST128).

In addition, if the timing of the presentation is neither just before nor just after the recognition (NO at step ST126), the display controller 3 delivers the display data generated from the character strings of the conversation recognized by the voice recognition unit to the display unit 4 to display (step ST128).

In this way, the present embodiment 12 continually catches the conversation in the vehicle and carries out voice recognition just as the embodiment 1, and presents the conversation. Only it decides the necessity of the output of all or part of the speech contents according to the vehicle state detected by the vehicle state detector or the prescribed keyword extracted by the keyword extraction unit, creates only the display data of all or part of the speech contents as to which a decision is made that the output is necessary, and presents the conversation only when necessary. Accordingly, when the display of the conversation is unnecessary, it can display other contents. In addition, as for the timing of presenting the conversation, according to the vehicle state detected by the vehicle state detector or the prescribed keyword extracted by the keyword extraction unit, it decides the timing of the display start or display stop such as just after going into a tunnel, just before the keyword indicating that the conversation cannot be caught, and just after the keyword instructing to display, and carries out control in a manner as to present the conversation at the timing required or not to display after detecting the keyword instructing not to display.

Incidentally, a configuration is also possible which creates, if a keyword the keyword extraction unit 13 extracts contains a prescribed expression, the display data by converting the prescribed expression to a prescribed different expression or prescribed image (or the voice data by converting the prescribed expression to a prescribed different expression or prescribed voice), or creates, if a prescribed abbreviation or a word used to replace another word or a dialect is contained, the display data (or voice data) by converting the prescribed abbreviation or the word used to replace another word or the dialect to a prescribed standard expression. To be concrete, for example, it replaces a brand name by its brand mark, an emotional expression like "We did it" to a pictorial symbol, and outputs a sound effect like a hand clap as to a keyword such as "Congratulations!".

This will make it possible to present a clear-cut expression for an expression difficult to understand, and hence to confirm the conversation contents more clearly.

As described above, according to the present embodiment 12, it continually catches the conversation in the vehicle and carries out the voice recognition, and presents the conversation only when necessary and at timing required according to the vehicle state detected by the vehicle state detector or the prescribed keyword extracted by the keyword extraction unit. Accordingly, it enables confirming the conversation contents as the need arises, and if not necessary, it enables displaying other contents.

An onboard information device in accordance with the present invention is applicable to an onboard navigation system, onboard audio system, onboard video system or the like that can perform voice interaction between a passenger and the system.

Incidentally, it is to be understood that a free combination of the individual embodiments, variations of any components of the individual embodiments or removal of any components of the individual embodiments is possible within the scope of the present invention.

Industrial Applicability

An onboard information device in accordance with the present invention is applicable to an onboard navigation system, onboard audio system, onboard video system or the like that can perform voice interaction between a passenger and the system.

Description of Reference Numerals 1 voice acquisition unit; 2 voice recognition unit; 3 display controller (output controller); 4 display unit (output unit); 5 signal processing unit; 6 speech-active section detector; 7 speech data extraction unit; 8 speech data sequence arrangement unit; 9 recognition waiting speech data storage; 10 voice output reservation decision unit; 11 voice output controller (output controller); 12 voice output unit (output unit); 13 keyword extraction unit; 14 conversation history storage; 30 in-vehicle environmental state detector (vehicle state detector); 31 voice S/N acquisition unit; 32 audio system operating state acquisition unit; 33 air conditioner operating state acquisition unit; 34 in-vehicle noise state acquisition unit; 35 window or roof opening/closing state acquisition unit; 36 voice feature information acquisition unit; 40 vehicle surrounding state detector (vehicle state detector); 41 time acquisition unit; 42 weather state acquisition unit; 50 vehicle operating state detector (vehicle state detector); 51 steering state acquisition unit; 52 gearshift lever operating state acquisition unit; 53 brake operating state acquisition unit; 54 direction indicator operating state acquisition unit; 55 illumination state acquisition unit; 56 wiper operating state acquisition unit; 61 vehicle position acquisition unit; 62 vehicle speed signal acquisition unit; 63 acceleration acquisition unit; 64 direction acquisition unit; 65 continuous traveling time acquisition unit; 66 continuous traveling distance acquisition unit; 67 traveling road type acquisition unit; 68 traveling road surface state acquisition unit; 69 traveling road congestion state acquisition unit; 70 traveling route setting state acquisition unit; 71 traveling route guidance state acquisition unit; 72 map data storage.

What is claimed is:

1. An onboard information device which is mounted on a vehicle to provide information for supporting a passenger, the onboard information device comprising:

a voice acquisition unit that continually detects and acquires voice the passenger utters while the onboard information device is in operation;

a voice recognition unit that recognizes speech contents of the voice acquired by the voice acquisition unit;

a keyword extraction unit that extracts a prescribed keyword from the speech contents recognized by the voice recognition unit;

a vehicle state detector that detects a vehicle state including an environmental state in the vehicle, a surrounding state of the vehicle or an operating state of the vehicle; and an output controller that creates display data or voice data from the speech contents recognized by the voice recognition unit in accordance with the vehicle state detected by the vehicle state detector and the keyword extracted by the keyword extraction unit, and that carries out output control of the display data or voice data to an output unit.

2. The onboard information device according to claim 1, wherein
the onboard information device is one of an onboard navigation system, an onboard audio system, and an onboard video system.

3. The onboard information device according to claim 1, further comprising:
a conversation history storage that stores the speech contents recognized by the voice recognition unit, wherein
the output controller creates the display data or voice data using the speech contents stored in the conversation history storage.

4. The onboard information device according to claim 1, wherein
the vehicle state detector detects as the environmental state in the vehicle a located state of one of the passenger, voice acquisition unit and output unit.

5. The onboard information device according to claim 1, wherein
the vehicle state detector detects, as the environmental state in the vehicle, one of the S/N ratio of the voice the voice acquisition unit acquires, an operating state of an in-vehicle audio system or an air conditioner, an in-vehicle noise state, and a window or roof opening/closing state.

6. The onboard information device according to claim 1, wherein
the vehicle state detector detects, as the environmental state in the vehicle, an emotional state of the passenger who utters the voice by estimation from voice feature information including one of a type, volume, interval, sound quality, tone, color, tempo, and frequency characteristics of the voice the voice acquisition unit acquires.

7. The onboard information device according to claim 1, wherein
the vehicle state detector detects, as the surrounding state of the vehicle, one of the present date, time, a day of the week, and a weather state in vehicle surroundings.

8. The onboard information device according to claim 1, wherein
the vehicle state detector detects, as the operating state of the vehicle, one of operation states of steering, gearshift lever, brakes, direction indicators, illumination, and wipers.

9. The onboard information device according to claim 1, wherein
the vehicle state detector detects, as the operating state of the vehicle, one of the present position, speed, acceleration, direction, continuous traveling distance, continuous traveling time, traveling road type, traveling road surface state, traveling road congestion state, traveling route setting state, and traveling route guidance state of the vehicle.

10. The onboard information device according to claim 1, wherein
the output controller creates the display data or voice data of different modes in accordance with the vehicle state detected by the vehicle state detector or the keyword extracted by the keyword extraction unit.

11. The onboard information device according to claim 10, wherein
the display data or voice data of the different modes are comprised of display data which differs in one of a type of display characters or display images, their form, size, color, density, brightness, and layout of the display characters or display images on a screen, or voice data which differs in one of a type of the voice, its volume, interval, sound quality, tone, color, tempo, acoustic image, reverberation, number of channels, and frequency characteristics.

12. The onboard information device according to claim 1, wherein
the output controller decides necessity of outputting all or part of the speech contents in accordance with the vehicle state detected by the vehicle state detector or the keyword extracted by the keyword extraction unit, and creates or does not create the display data or voice data of all or part of the speech contents.

13. The onboard information device according to claim 1, wherein
the output controller decides on whether the keyword contains a prescribed expression or not, and creates, when deciding that the keyword contains the prescribed expression, the display data or voice data by converting the prescribed expression to a prescribed different expression or a prescribed image or prescribed voice.

14. The onboard information device according to claim 1, wherein
the output controller decides on whether the keyword contains a prescribed abbreviation or a word used to replace another word or a dialect, and creates, when deciding that the keyword contains the prescribed abbreviation or the word used to replace another word or the dialect, the display data or voice data by converting the prescribed abbreviation or the word used to replace another word or the dialect to a prescribed standard expression.

15. The onboard information device according to claim 1, wherein
the output controller decides timing of an output start or output stop of the display data or voice data in accordance with the vehicle state detected by the vehicle state detector or the keyword extracted by the keyword extraction unit, and controls the output unit so as to make the output start or output stop of the display data or voice data at the timing decided.

16. The onboard information device according to claim 1, wherein
the output controller creates, when a plurality of passengers are in the vehicle, the display data or voice data with a mode that enables identification of the plurality of passengers who utter speech.

17. The onboard information device according to claim 1, wherein
the output controller, when a plurality of output units are provided, selects or changes or switches the output units that will output or will not output the display data or voice data in accordance with the vehicle state detected by the vehicle state detector or the keyword extracted by the keyword extraction unit.

* * * * *